(12) United States Patent
Rowan

(10) Patent No.: US 7,529,689 B2
(45) Date of Patent: May 5, 2009

(54) SYSTEMS, METHODS, AND MEDIUMS FOR TRANSACTION MANAGEMENT

(75) Inventor: Wingham Rowan, London (GB)

(73) Assignee: Guaranteed Markets Ltd, London (GB)

( * ) Notice: Subject to any disclaimer, the term of this patent is extended or adjusted under 35 U.S.C. 154(b) by 259 days.

(21) Appl. No.: 10/476,523

(22) PCT Filed: May 2, 2002

(86) PCT No.: PCT/IB02/01475

§ 371 (c)(1),
(2), (4) Date: Mar. 10, 2004

(87) PCT Pub. No.: WO02/091100

PCT Pub. Date: Nov. 14, 2002

(65) Prior Publication Data

US 2004/0139032 A1      Jul. 15, 2004

(30) Foreign Application Priority Data

May 3, 2001    (GB) .................................. 0110893.5

(51) Int. Cl.
*G06Q 30/00* (2006.01)
(52) U.S. Cl. .................. 705/26; 705/1; 705/80
(58) Field of Classification Search ............ 705/1, 705/26, 27
See application file for complete search history.

(56) References Cited

U.S. PATENT DOCUMENTS

| | | | |
|---|---|---|---|
| 5,592,376 A | 1/1997 | Hodroff | |
| 6,041,308 A * | 3/2000 | Walker et al. | 705/14 |
| 6,260,024 B1 * | 7/2001 | Shkedy | 705/37 |
| 6,993,503 B1 * | 1/2006 | Heissenbuttel et al. | 705/37 |
| 7,069,234 B1 * | 6/2006 | Cornelius et al. | 705/26 |
| 7,143,057 B2 * | 11/2006 | Kuelbs et al. | 705/26 |
| 2001/0027437 A1 * | 10/2001 | Turbeville et al. | 705/38 |
| 2002/0178069 A1 * | 11/2002 | Walker et al. | 705/26 |
| 2006/0212388 A1 * | 9/2006 | Van Luchene et al. | 705/39 |
| 2006/0242036 A1 * | 10/2006 | Walker et al. | 705/34 |
| 2007/0016486 A1 * | 1/2007 | Stone et al. | 705/26 |

OTHER PUBLICATIONS

The buyer can't lose, Purchasing, Murray John, pp. 1-3, Feb. 1997.*

* cited by examiner

*Primary Examiner*—Jeffrey A. Smith
*Assistant Examiner*—Jason Dunham
(74) *Attorney, Agent, or Firm*—Ladas & Parry LLP

(57) ABSTRACT

A transaction management system is described in which transactions between buyers and sellers are monitored to determine sellers qualifying for guaranteed or underwritten status. The sellers log details of their goods or services with the system which are then presented to buyers together with an indication of the seller's underwritten status. A buyer purchasing from a guaranteed or underwritten seller using the system obtains some form of compensation in the event that the seller does not deliver as promised. In a preferred embodiment, the system selects an alternative service or good for delivery to the buyer by the agreed date using the database of sales data. The sellers are advantageously graded into brands using historical transaction-related data.

31 Claims, 22 Drawing Sheets

High St. Temps

QUERY: gen. secretarial / Excel / tomorrow / 09.30-17.30

We have 61 secretaries available for your booking tomorrow. Please click on the grade you require.

| GRADE OF TEMP | LOWEST COST FOR YOUR BOOKING | No. AVAILABLE FOR YOUR BOOKING |
|---|---|---|
| Office Manager | £100.52 | 4 |
| Executive Assistant | £95.38 | 6 |
| Senior Secretary | £87.62 | 4 |
| Secretary | £82.48 | 6 |
| Junior Secretary | £76.31 | 8 |
| Office Assistant | £63.58 | 12 |
| Probationary | £51.32 | 12 |
| Entry level | £48.19 | 9 |

Temps in these top three grades are GUARANTEED and have a long track record of employer satisfaction.

These temps have experience and are climbing towards our top grades.

We can vouch nothing about these individuals except that they would like your job.

*Click here for explanation of grades.

Figure 4b

High St. Temps

Further information for Tim Smith.

1. REPORTING ADDRESS:
- ACME corp
- 32 High Street
- Watford
- London NE22 1HP

NEAREST STATION:
- Epping

FROM STATION:
- walk | 10 mins

2. INFORMATION ABOUT THE ASSIGNMENT AND YOUR OFFICES:

Working alone or in a team? small team
Smoking room provided: NO
How likely is a job extension? Not expected
Parking available: FREE
Company website: www.acme.co.uk
Kitchen area: YES

3. REPORTING INSTRUCTIONS:
At reception ask for Mary Smith
Contact if last minute problems: Mary Smith 07977 116693

4. NOTES:
Please enter any notes for Tim Smith here:

5. DRESS CODE:
formal

Figure 4e

High St. Temps

CONTRACT: Hire of a senior secretary

CONTRACT BETWEEN:

Tim Smith
Of
High St Agency
Watford
0345 484950
("the secretary")

AND:

Mary Smith
ACME corp
71 High Road
London
07977 116693
("the employer")

| Debited from account: | Released to secretary after: |
|---|---|
| £87.62 | 48hrs |
| minus marketplace and agency commission | |

BY WHICH IT IS AGREED:

The Secretary shall make his full professional services available according to the employer's instructions, for secretarial work on the employer's premises between 09.30 and 17.30 tomorrow. In return the employer will pay the sum set out below.

The employer warrants that:

1. The premises where the secretary is required to work comply with all relevant health and safety legislation.
2. The secretary is absolved of any software piracy issues.
3. A no smoking policy will be enforced in the area where the secretary is to work.
4. Beverage making facilities and materials are provided free of charge.
5. The work required of the secretary will not contravene any law and would not be deemed offensive to any reasonable person.

The secretary warrants:

1. He will arrive at and depart from the employer's premises at the times specified.
2. He will give the employer's task his undivided attention and carry out all reasonable instructions with Diligence
3. The employer's equipment will not be used for personal purposes.
4. He will comply with all reasonable security procedures expected by the employer
5. He will not abuse the employer's no smoking policies
6. All matters of the employer's work will remain confidential.
7. Breaks from work will be at the discretion of the employer.

We will be contacting Tim Smith by mobile phone about this job.

ENTER PAYMENT NUMBER TO SIGN: [          ]

Figure 4f

JOB NOTIFICATION

TIMES:

TOMMOROW:
3$^{RD}$ February
08.30 to 17.30
One day only

LOCATION

London NE22

YOUR HOURLY RATE:

£8.58

CONFIRM BY:

15.00
accept: 1   reject: 2

Figure 5b

SYSTEMS, METHODS, AND MEDIUMS FOR TRANSACTION MANAGEMENT

This invention is generally concerned with the supply of goods and/or services from a buyer to a seller via an intermediary, in particular where an aspect of the supply chain is guaranteed or underwritten by the intermediary. The invention is especially applicable to the electronic management of such transactions using a communications network, for example, the Internet.

It is known to provide on-line market-places of a variety of different kinds. These include on-line auctions, request-for-quote services such as that operated by Priceline.com, bulletin boards, which operate analogously to paper-based noticeboards, e-mail ordering services, and electronic catalogues. More sophisticated systems for controlling manufacturing via the Internet are also known, for example, for obtaining the best prices for supplies that manufacturers need or products that consumers want. Generally speaking, however, open electronic market-places suffer from a number of problems in part related to the anonymity of such systems. In particular an open electronic market-place will include a mixture of reliable and unreliable sellers, and it can be difficult for a buyer to shop with confidence. The seller may not actually have the goods he or she is purporting to sell, the goods may not be fairly described, the seller may not be reliably contactable through the market-place to be informed he or she has a sale, the seller may not accept a sale at the price initially displayed to the buyer, and the seller may not dispatch the purchased item when promised.

Even in relatively simple transactions many things can go wrong. Complaints about non-delivery of goods and non-contactability of sellers are common in on-line market-places and often it can be very difficult for a buyer to take any effective action against a seller.

Previous attempts to get around these problems have generally relied upon some form of vetting process for sellers, although this tends to be time consuming and expensive, and only justified where high volume or high value transactions are concerned. This is rarely justified and hence rarely performed in the case of individual sellers even where it may be very important, for example, where a baby-sitting service is being offered. Another strategy is to attempt to identify trustworthy and reliable sellers using a "community rating" system in which buyers are invited to rate sellers with whom they have done business. However this method of rating sellers is unreliable and open to fraud by, for example, the posting of false rating data.

WO00/30051 describes a system for facilitating business transactions over a network by providing a reliable verification source. This describes a verification process in which, on receiving a request from a buyer to initiate a transaction over the Internet, a seller sends a verification identification to the buyer. The buyer then designates a verification code and sends the verification identification to the verification node and receives back a verification and/or guarantee, after which the buyer completes the transaction with the seller over the Internet. U.S. Pat. No. 5,117,353 describes a software system which schedules temporary personnel from a job order communicated electronically from a client. U.S. Pat. No. 5,592,375 describes a computer system for assisting an employer's hiring of full- or part-time employees from a rank-ordered pool of candidates. U.S. Pat. No. 5,794,207 describes a system allowing prospective buyers of goods and services to communicate a binding purchase order globally to potential sellers, for sellers conveniently to search for relevant buyer purchase offers. Potential sellers then have the option to accept a purchase offer and thus bind the corresponding buyer to a contract. U.S. Pat. No. 6,041,308 describes a conditional purchase order management system which compensates buyers if the buyer's conditional purchase offer is rejected or expires before an acceptance is received. However, this system operates in the context of buyer-defined conditions for the purchase of goods or services at a buyer-defined price and is not applicable to more conventional transaction arrangements in which a seller makes an offer which is accepted (or rejected) by a buyer.

There therefore exists a need for an improved system for protecting buyers purchasing goods or services from remote sellers, for example over a communications network such as the Internet.

According to the present invention, there is therefore provided a transaction management system for managing the purchase of an item and/or service by a buyer from a seller, the system comprising; a data store for storing seller data comprising, for each of a plurality of sellers, a seller identifier, seller offer data indicating at least one service or item of commerce offered for sale; a program store storing processor implementable instructions; and a processor coupled to the data store and to the program store for implementing the stored instructions; wherein the stored instructions comprise instructions for controlling the processor to: implement a buyer interface to output seller offer data for a plurality of sellers, and to receive a purchase request from the buyer accepting a said offer, the purchase request comprising request data indicating a service or item of commerce requested by the buyer; identify a seller offering the requested service or item; implement a seller interface to output the request data to the identified seller for requesting purchase of the service or item; ascertain compliance data for determining whether the identified seller is willing or able to comply with the buyer purchase request; and output compensation data for compensating the buyer if said compliance data indicates that the identified seller is not willing or able to comply with the request.

The transaction management system allows a buyer to be compensated when a requested item or service is not available, or is not available from an identified seller. The seller offer data may comprise offers of services or items from one or a group of sellers and, preferably, includes price data specifying a buyer purchase price for buyers purchasing the services or items on offer.

The system may identify a seller offering the service or item requested by the buyer but, in a preferred embodiment, the buyer's purchase request includes seller and/or service or item identification data for identifying a seller of the item or service. The system then, in effect, provides a guarantee or underwrites the seller's offer data, as stored in the data store, and compensates the buyer if the identified seller is not willing or able to comply with the requested purchase. For example, the seller may (effectively) not be able to comply with the buyer's purchase request if the seller is not contactable before a buyer or system deadline or if the goods (items) or service delivered to the buyer are not as agreed. Alternatively, the seller may not be willing to accept the buyers' purchase request.

The compliance data may simply comprise data for determining whether the seller has contacted the system during a predetermined time window, or the compliance data may determine whether or not the identified seller accepts or rejects the purchase request, or the data may relate to the acceptability of the goods or services to the buyer, or any combination of these. The system may ascertain the compliance data by monitoring communications of the seller with the system to determine whether the seller logs in as agreed, or the system may ascertain the compliance data by inputting the data from a seller and/or buyer, for example by means of the seller and buyer terminals, or the compliance data may comprise data ascertained using both these methods.

Preferably the purchase request includes a deadline indicating a date and/or time by when a response to the purchase request is required and the stored instructions include instructions to determine a system confirmation deadline using the purchase request deadline, identify a seller offering the requested service or item and contactable by the confirmation deadline; monitor communication of the identified seller with the system to ascertain said compliance data; determine whether the identified seller has accepted the requested purchase by the confirmation deadline using the compliance data; and output compensation data for compensating the buyer if the identified seller has not accepted the requested purchase by the confirmation deadline. The system monitors the sellers communications to determine whether the seller is, in fact, contacted and preferably the compliance data indicates whether the seller was contacted and, if the seller was contacted, the sellers response (i.e. acceptance or rejection) to the purchase request.

The deadline for responding to the purchase request may simply be a delivery deadline or it may be a confirmation deadline specified by the buyer for the system to confirm to the buyer that the purchase request will be met. The system determines an internal confirmation deadline using the purchase request deadline, which is generally in advance of the purchase request deadline to enable the system to identify an alternative seller should the requested or first identified seller not be contactable or decline the purchase request. In such a situation the internal deadline can then be moved on without missing the buyer's deadline.

The system effectively permits the intermediary to guarantee that the offers it makes on behalf of the sellers to the buyer will be fulfilled, underwriting these offers with a promise of compensation should the requested item or service not be available or not be available in the form specified by the buyer. The system operator acts as an intermediary and may either guarantee that an item or service is available from a particular seller or may simply guarantee availability of a requested item or service fit for the buyer's purpose. If the requested item/service/seller is not available the buyer is compensated either by the provision of an equivalent or better item or service or in some other way, for example, by means of a sum of money paid from the intermediary system operator to the buyer.

Thus the compensation data may comprise data for making an offer to the buyer of an alternative item or service, or of an alternative seller (of an equivalent or better item or service) or of a sum of money or other payment. Alternatively the compensation data may comprise data for making an offer to a seller other than the initially identified seller, for example, for (semi) transparently substituting a replacement item/service/seller for the requested item/service/seller. In this latter case the compensation data can be used to select an alternative item/service/seller available before the buyer's purchase request deadline for substitution of the buyer's requested item/service/seller. In either case an offer of compensation may be made to the buyer before confirmation of the form of compensation.

Where the compensation takes the form of a payment, the compensation data may comprise a payment flag or authorization data and, optionally, a compensation payment sum, preferably determined by the system. Where the identified seller has not accepted the requested purchase by the confirmation deadline and an alternative item or service is offered this will generally be from a different seller to that first identified, but may be an alternative from the same seller.

By guaranteeing or underwriting sellers or their products all parties benefit. The buyer benefits through peace of mind in knowing that either the requested service or item will be provided or they will be compensated. The guarantee may also be extended to cover criteria other than meeting the buyer's deadline such as, for example, the item or service being fairly described by the seller. The sellers benefit in that they are able to charge a higher price for their goods or services because of the guaranteed availability, and because the system operator or intermediary has undertaking to compensate the buyer if the sale goes wrong. The intermediary benefits through the increased volume of transactions encouraged by the guaranteed availability or underwritten provision of the goods or services offered. Moreover the intermediary is also able to increase the seller's offer price to offset the cost of compensating the buyers for the fraction of transactions which go wrong, and to add a further margin for profit. Furthermore, all this can be achieved without complex vetting procedures.

In a preferred embodiment the data store stores data relating to sellers who qualify for guaranteed or underwritten status and data relating to non-qualifying sellers. The intermediary offers goods and/or services from both guaranteed or underwritten sellers or for guaranteed/underwritten goods or services, as well as goods or services which are not underwritten. In this embodiment the system stores records of sales of goods/services/sellers who are not underwritten and uses these records to determined which goods/services/sellers qualify for underwriting by, for example, analysing seller behaviour, contactability, complaints against the seller, or other data. By storing such transaction records in the data store the underwritten status of a seller or their goods or services can be determined automatically.

In one embodiment the system monitors transaction data comprising the average value of sales (for a seller), the number of sales or level of service (for example, number of hours) provided, the number of buyers associated with a seller and, optionally, the number of different sellers they purchase from, the number of complaints against a seller, the number of occasions on which a seller fails to log in to the system (or is otherwise not contactable) to check for buyers' purchase requests, and/or the number of sales declined. Output of compensation data is triggered when an identified seller has not accepted a requested purchase by the (buyer's) confirmation deadline, which, in turn, can be triggered by the seller not being contactable, the seller not being able to complete the sale, or the buyer informing the system that the sale is not proceeding as it should.

In some embodiments the underwritten status of a seller is removed when the seller accumulates a minimum number of penalty points, penalty points being awarded against the seller when the seller informs the system that the sale cannot be properly completed. Preferably the number of penalty points awarded against the seller increases as the notice given by the seller to the system of non-completion of sale as agreed decreases.

In a preferred embodiment the buyer interface is implemented to present offers from both underwritten and non-underwritten sellers or goods/services, for example in response to a buyer enquiry. The sellers or goods/services may, optionally, be graded by the system using stored seller data. In such an embodiment the buyer interface may be implemented to allow a buyer to select a seller or goods/ services from the presented options, and the purchase request data may then include an indication of the buyer's selected or identified seller.

The system may, optionally, also identify the buyer and record buyer data in the data store to allow, for example, a seller to select buyers or a type of buyer to which the seller wishes to restrict sales or to whom the seller does not wish to sell. For example, certain sellers may wish to restrict sales to other businesses rather than individuals.

Preferably the data store also stores price data for the items or services offered together with price mark-up data for adding an intermediary's mark-up, particularly to at least partially offset the cost of compensation in those transactions which go awry. Preferably the buyer interface displays the seller's prices, marked up by the intermediary where appropriate, together with an indication of which of the sellers or which of their items/services on offer, are guaranteed or underwritten.

The underwritten status and price mark-ups can be determined based upon historical seller behaviour and the percentage of transactions which, based on this historical data, would have qualified for compensation had a transaction or transactions been underwritten.

In a preferred embodiment of the system the purchase request from the buyer binds the system (or system operator) to providing the requested service or item at the requested price. The buyer interface may be implemented to output confirmation of receipt of the purchase request once the request has been logged, but before the seller has been contacted to confirm acceptance of the request If, subsequently, it turns out that the request cannot be fulfilled the system then compensates the buyer either monetarily or otherwise, although such compensation will not generally include compensation for consequential losses which may have been suffered by the buyer. In this embodiment as soon as the buyer has confirmed his or her order, he or she can be absolutely confident of delivery or compensation.

In a preferred embodiment the buyer interface and seller interface are implemented as web pages accessible over the Internet. However in other embodiments the interfaces may be implemented using a mobile communications device, for example, by means of i-mode or wireless application protocol (WAP), or by using interactive TV, a personal digital assistant (PDA), or a touch-tone telephone with audio menu navigation.

Preferably the data store stores compensation criteria data defining one or more compensation criteria, and the seller data includes historical data comprising data relating to a past sales and/or contactability of a seller. The system may then determine whether the seller identified (by either the buyer or the system) for purchasing the requested service or item meets the compensation criteria, in order that the compensation data can be output conditionally upon the identified seller meeting the criteria.

The determination of whether sellers recorded in a data store meet the compensation criteria may either be performed separately for each transaction or may be performed in an underwriting determination process and the results of the determination stored in the data store together with, optionally, further information such as a maximum value of compensatable transaction. Thus the compensation is conditional upon the seller (or specified item or service) meeting predetermined compensation criteria, which may be selected according to the market in which the system operates.

Preferably the system manages transactions for underwritten and non-underwritten sellers and the buyer interface is configured to output an indication of which of the sellers (and/or services or items) meet the compensation criteria, in other words, to indicate those products which are effectively guaranteed by the system operator.

In embodiments of the system the contactability of the seller is an important feature for determining which sellers are to be underwritten. Thus preferably the seller data defines contactability windows for each seller, for example, 2 p.m. to 4 p.m. every weekday. Preferably the system includes code to monitor when a seller is in contact with the system, to check that the seller is contactable at at least some point during the seller's specified window or windows. The compensation criteria preferably include an historical contactability criterion, since buyers may need to be compensated where an identified seller is not contactable. The contactability criterion may define a minimum level of contactability and/or a maximum permitted number of missed contactability windows.

Other contactability criteria may include a maximum number or value of buyer complaints and/or a maximum number of value of declined sales. In the latter case a declined sale may be more heavily weighted if the sale is declined at short notice, that is, close to the buyer's confirmation or delivery deadline. One or more of the compensation criteria may also be dependent upon the value of a transaction so that, for example, stricter criteria are applied where the transaction value, and hence the possible compensation cost, is higher in monetary or other quantitative terms.

In a preferred embodiment an internal system confirmation deadline is determined using the purchase request deadline, for example, a buyer confirmation or delivery deadline, but is earlier than the actual purchase request deadline. For example, the confirmation deadline may be set at the purchase request deadline less a margin, the margin being determined as a percentage of the difference between an actual purchase date/time and the purchase request deadline. In this way where an identified seller has not accepted the purchase request by the internal deadline there is still time to determine a revised (internal) confirmation deadline and to select one or more alternative sellers.

In one embodiment of the system the compensation data comprises data indicating a compensating offer for the buyer, to replace or supplement the requested service or item. Preferably the compensating offer comprises an offer of an equivalent or better item or service at the same or a reduced cost, but in practice the compensation may not be complete. The compensating offer is made to the buyer and, if the buyer accepts, the system then attempts to contact a seller of the alternative service or item, to confirm with the seller that the alternative can be provided. The compensating offer is determined by the system using data relating to services and items on offer stored in the data store.

In a variant of this embodiment the system may contact a seller of the alternative service or item to check its availability before making the compensating offer to the buyer but, generally speaking, a purchase order will only be placed with a seller of the alternative once the buyer has confirmed acceptance of the compensating offer. In other variants the buyer's acceptance of the compensating offer is not sought and the buyer is simply supplied with the alternative and, preferably, notified of the amendment.

Preferably the seller data includes price data for the services/items on offer and the data store further comprises price adjustment data, the system calculating adjusted prices for sellers meeting the one or more compensation criteria. The price adjustment data may be determined using historical transaction data, for example in an iterative process based upon a percentage of sales which would have met the compensation criteria had these historically been in place.

In one embodiment of the system the compensation criteria data include data defining a threshold seller grade and the system determines the grade of a seller using historical data relating to the sellers transactions. Thus, for example, each seller may be assigned to one of a plurality of grades, one or more of the higher grades being guaranteed or underwritten. The criteria for grading the sellers (or the goods or services they sell) may depend partly upon the seller or goods/services themselves. For example it may be based upon quality criteria, and partly upon historical data such as numbers of complaints, missed contactability windows and the like.

In a preferred embodiment the sellers are automatically incremented through the grades as the number or value of successfully completed transactions increases. Again, the guaranteed or underwritten grades may be determined based upon an analysis of past trading behaviour, taking into account the risk of a seller defaulting on a transaction. The prices of items or services offered for sale may depend upon a seller's grade and may, in some embodiments, be entirely determined by a seller's grade.

In one embodiment the compensation data comprises purchase data requesting purchase of an alternative service or item of commerce to that requested by the buyer, from an alternative seller to the first identified seller. In this embodiment the system selects an alternative seller and provides the compensation data to the seller for purchasing the alternative service or item without first offering the alternative to the buyer.

This embodiment of the system makes a semi-transparent substitution of the alternative service or item for the requested service or item if the first identified seller does not accept the buyers purchase request. Thus the compensation data is used for compensating the buyer by substitution of an alternative, preferably better, service or item than that initially requested.

In this embodiment the system preferably determines a revised confirmation deadline, still within the purchase request deadline, and determines whether a seller of the alternative service or item accepts a purchase request for the alternative before the revised deadline. If the alternative seller accepts the system may then confirm the substitution to the buyer; alternatively if the alternative seller does not accept the purchase request the system still has time to determine a further revised confirmation deadline and select a further seller, albeit with short notice, for compensating the buyer with a higher grade substitute service or item.

In general the shorter the notice the more expensive the substitute service or item, but this cost is borne by the intermediary or system operator rather than by the buyer or seller. Therefore the system preferably determines an alternative service or item for provision to the buyer as compensation by determining what alternatives can be provided before the buyer's purchase request deadline, irrespective of price.

In another aspect the invention provides a method for managing the purchase of an item and/or service by a buyer from a seller, the method comprising: storing in a data store seller data comprising, for each of a plurality of sellers, a seller identifier, seller offer data indicating at least one service or item of commerce offered for sale; implementing a buyer interface to output seller offer data for a plurality of sellers, and to receive a purchase request from the buyer accepting a said offer, the purchase request comprising request data indicating a service or item of commerce requested by the buyer; identifying a seller offering the requested service or item; implementing a seller interface to output the request data to the identified seller for requesting purchase of the service or item; ascertain compliance data for determining whether the identified seller is willing or able to comply with the buyer purchase request; and outputting compensation data for compensating the buyer if said compliance data indicates that the identified seller is not willing or able to comply with the request.

This method broadly corresponds to the processes implemented by the above-described transaction management system, and provides similar benefits and advantages.

In a complementary aspect, the invention further provides a buyer terminal for a buyer to remotely purchase a service or item from a seller via an intermediary system, the terminal comprising: a data memory operable to store data to be processed; a program store for storing processor implementable instructions; a communications interface for receiving data from and transmitting data to the intermediary system; and a processor, coupled to the data memory, to the program store for implementing the stored instructions, and to the communications interface for receiving and storing instructions for the processor in the program store; and wherein, in use, the program store stores instructions for controlling the processor to: receive seller data comprising, for each of a plurality of sellers, seller offer data indicating at least one service or item of commerce offered for sale; generate a user interface to output said seller offer data and to receive a purchase request from the buyer accepting a said offer, the purchase request comprising request data indicating a service or item of commerce requested by the buyer; transmit the purchase request to the intermediary system; receive buyer notification data from the intermediary system, the buyer notification data including compensation data for making a compensating offer to the buyer; and output a said compensating offer to the buyer.

In one embodiment the processor receives and stores instructions for Internet data pages, such as HTML (Hyper Text Mark up Language), XML (Extensible Mark up Language), Java, WAP, or other instructions. Separate sets of web page instructions may generate user interfaces to receive a purchase request and transmit the request to the intermediary system, and to output the compensating offer.

In embodiments of the terminal other web pages may be received, stored and executed to generate, for example, a buyer enquiry user interface for interrogating the above described system data store, and for selecting a seller of a service or item in an enquiry results page for transmission back to the intermediary system. As described above with reference to the transaction management system, sellers displayed on the enquiry results page preferably include both underwritten and non-underwritten sellers, together with an indication of which is which.

The skilled person will appreciate that although web pages or other similar instructions for controlling a processor will generally be cached in the buyer terminal, it is not necessary for all the instructions for controlling the processor to be present in the program store simultaneously. For example, in use, sets of instructions such as instructions for web page may be successively received by the terminal over the communications interface. Correspondingly some or all of the instructions may, in other embodiments, be permanently stored within the buyer terminal.

In a complementary aspect, the invention provides a method for using a buyer terminal to remotely purchase a service or item from a seller via an intermediary system, the method comprising: receiving seller data comprising, for each of a plurality of sellers, seller offer data indicating at least one service or item of commerce offered for sale; generating a user interface to output said seller offer data and receive a purchase request from the buyer accepting a said offer, the purchase request comprising request data indicating a service or item of commerce requested by the buyer; transmitting the purchase request to the intermediary system; receiving buyer notification data from the intermediary system, the buyer notification data including compensation data for making a compensating offer to the buyer; and outputting a said compensating offer to the buyer.

In another aspect the invention provides a seller terminal for a seller to remotely sell a service or item of commerce to a buyer via an intermediary system, the terminal comprising: a data memory operable to store data to be processed; a program store for storing processor implementable instructions; a communications interface for receiving data from a transmitting data to the intermediary system; and a processor, coupled to the data memory, to the program store for implementing the stored instructions, and to the communications interface for receiving and storing instructions for the processor in the program store; and wherein, in use, the program store stores instructions for controlling the processor to: generate a sale offer user interface to input sale offer data indicating at least one service or item of commerce offered for sale by the seller and a corresponding price; transmit the sale offer data to the intermediary system; receive purchase request data from the intermediary system, the purchase request data comprising request data indicating a service or item of commerce requested by a buyer; and generate a purchase request user interface to output the purchase request data to the seller and to input seller acceptance data indicating whether the seller accepts the purchase request; transmit the seller acceptance data to the intermediary system.

In a preferred embodiment of the seller terminal the purchase request user interface also outputs a confirmation deadline provided to the terminal from the intermediary system. Either the seller terminal or the intermediary system may be employed to check whether the seller responds to the purchase request prior to this deadline.

In a preferred embodiment, the terminal also generates a user interface to input a seller confirmation code, such as a personal identification number (PIN) or password, and transmits this code to the intermediary system. This function may be provided within the purchase request user interface.

In a further complementary aspect the invention provides a method of using a seller terminal to remotely purchase a service or item of commerce from a buyer via an intermediary system, the method comprising: generating a sale offer user interface to input sale offer data indicating at least one service or item of commerce offered for sale by the seller and a corresponding price; transmitting the sale offer data to the intermediary system; receiving purchase request data from the intermediary system, the purchase request data comprising request data indicating a service or item of commerce requested by a buyer; and generating a purchase request user interface to output the purchase request data to the seller and to input seller acceptance data indicating whether the seller accepts the purchase request; transmitting the seller acceptance data to the intermediary system.

According to a further aspect of the invention there is provided a method of supplying goods and/or services from a buyer to a seller via an intermediary, the method comprising: logging details of goods/services on offer from a plurality of sellers; determining sellers and/or goods/services qualifying for underwritten status; outputting offers of underwritten sellers and/or goods/services to a buyer; accepting a purchase request from a buyer for underwritten goods/services; forwarding the purchase request to a seller; and compensating the buyer of the underwritten goods/services if the goods/services are not provided in accordance with one or more criteria underwritten by the intermediary.

In this context, "underwriting" refers to compensation of the buyer if the requested goods or services or seller are not in accordance with one or more underwritten criteria. For example, this may be because the goods or services are not available or are not available in the form requested.

The buyer is compensated by the intermediary by, for example, a compensatory payment or a supply of alternative goods or services. The intermediary recovers the cost of this compensation not directly from an individual seller defaulting on a transaction but rather by spreading the cost of providing compensation, for example across all the buyers and/or sellers.

The method is preferably implemented electronically over a communications network but in embodiments may be implemented using conventional phone/mail/fax communications.

In a preferred embodiment of the method the sellers are graded and promoted (or demoted) between grades based upon their transaction history. For example, once a certain number of transactions have been successfully completed, with less than a maximum permitted number of complaints, a seller may be granted underwritten status and thus qualify for a "guarantee" and compensation by the intermediary should that seller fail to deliver as promised.

In the above-described aspects of the invention communication between the system operator or intermediary and/or buyer and/or seller may be by any convenient communication means, but the invention is particularly suited to implementation using an electronic communications network such as the Internet, and Intranet, or an Extranet, or wireless mobile communications.

In preferred embodiments the invention is implemented on general purpose computer systems using appropriate software. The software may comprise instructions in one or more of HTML, XML, Java, Perl or other programming languages. Thus aspects of the invention may be embodied in computer program code, either as separate applications or parts of a single program. As the skilled person will appreciate, such program may comprise source, object or executable code and code may be implemented on a single machine or shared between different hardware platforms. Such program code may be provided on any conventional carrier medium such as tape, disk, CD-ROM, programmed memory or on an electrical or optical signal carrier. The processor implementable instructions of the buyer and seller terminals may be stored on a network server and provided to the terminal as needed, for example as an Internet data page or web page.

The above and other aspects of the present invention will now be further described, by way of example only, with reference to the accompanying figures in which:

FIGS. 4a to 4f show web page screen displays for a buyer terminal user interface;

FIGS. 5a to 5c show screen displays for a seller terminal user interface;

Figure 1:
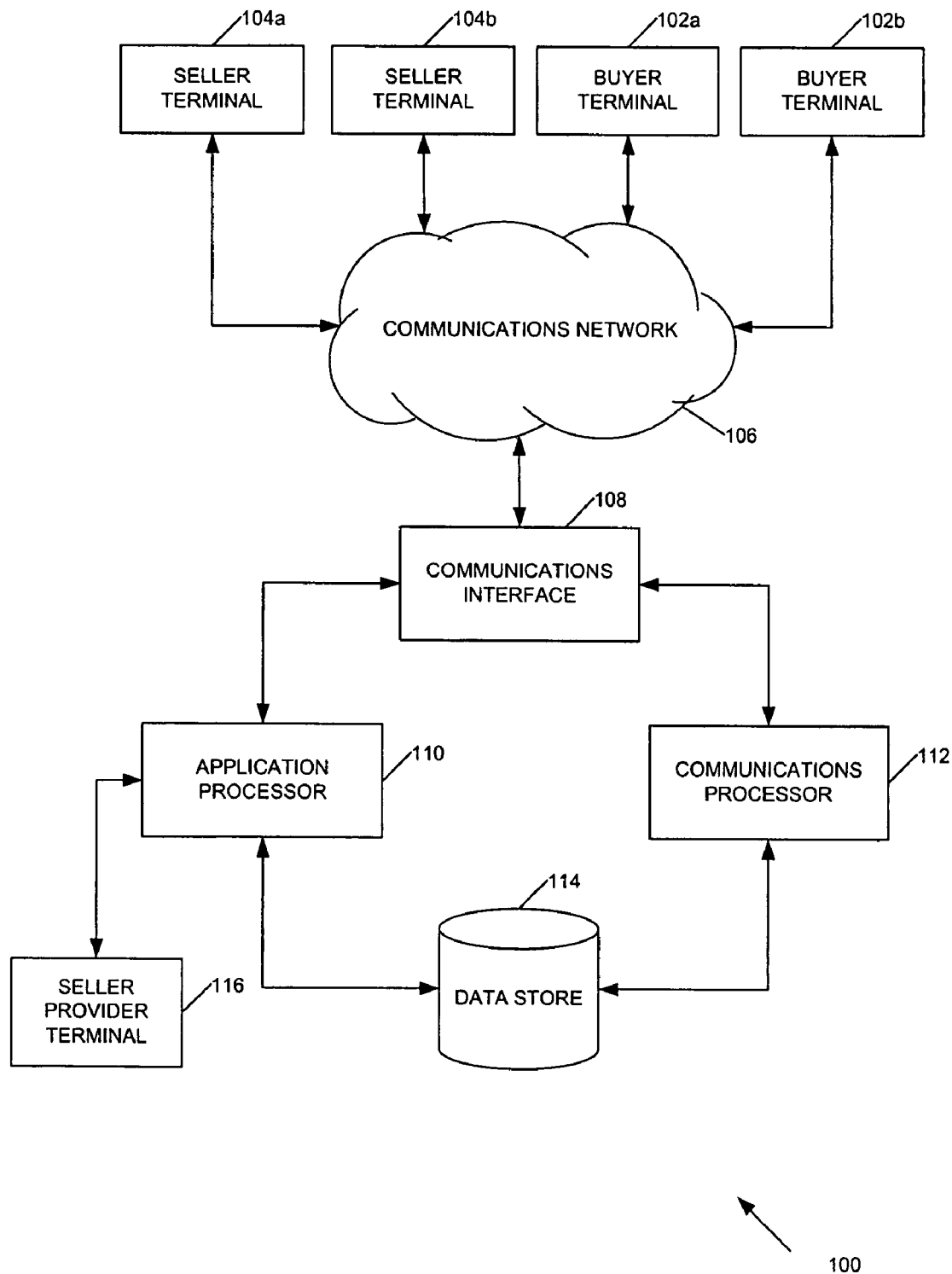
FIG. 1 shows a block diagram of a generalised embodiment of a transaction management system.

Referring first to FIG. 1, this shows a generalised embodiment 100 of the present invention.

A communications network 106 is connected to seller terminals 104a and b and buyer terminals 102a and b and to a system communications interface 108. The communications network may comprise any conventional communications network such as a telephone network or the Internet. The communications network couples the buyer and seller terminals to the system communications interface 108 to provide user interfaces to the system to allow buyers and sellers to request and execute transactions using the system.

The communications interface 108 is coupled to a communications processor 112 for communicating with buyer and seller terminals 102 and 104, and to an application processor 110 for providing transaction management applications. Application processor 110 is also coupled to a system service provider terminal 116 to allow a system service provider/operator direct access to aspects of the system to which access via communications network 106 is restricted for security reasons. Thus service provider terminal 116 may be used for system management, account management, program code updating and similar functions. Both application processor 110 and communications processor 112 are coupled to data store 114 storing system-related data. Thus application processor 110 can process this data for output to buyer and seller terminals 102 and 104 and communications processor 112 can access the data to send and receive messages to and from terminals 102 and 104. Thus data in data store 114 is indirectly accessible via buyer and seller terminals 102 and 104. The communications processor 112 is not an essential feature of the system since communications may be handled by application processor 110.

The communications interface 108, the application processor 110, the communications processor 112 and the data store 114 may all be provided within a single general purpose computer or these functions may be distributed over a plurality of machines in a manner well known to those skilled in the art.

Figure 2:
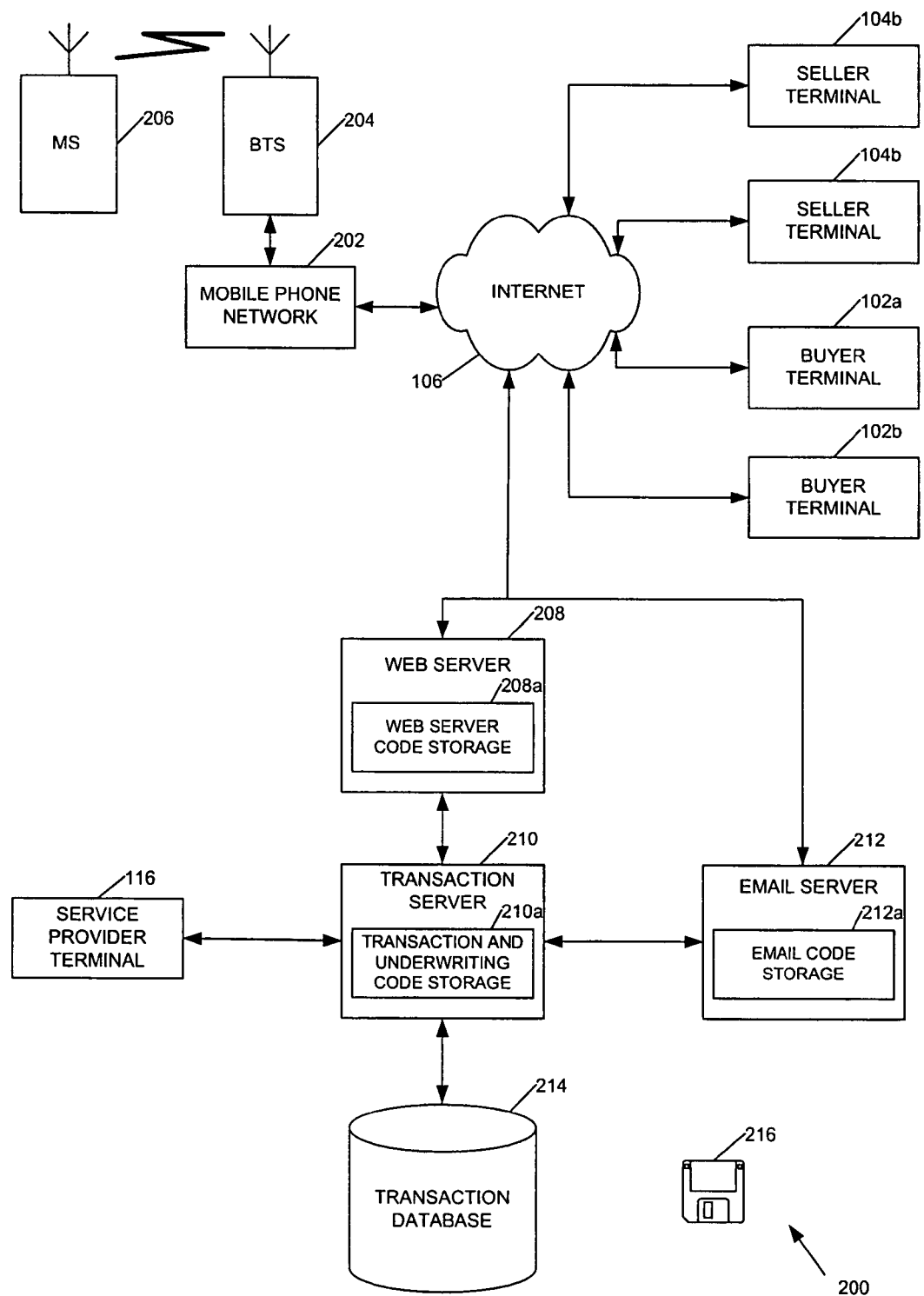
FIG. 2 shows a more detailed block diagram of an embodiment of a transaction management system.

Referring now to FIG. 2, this shows a more detailed block diagram of a specific embodiment 200 of the system. The communications network 106 in this embodiment is the Internet to which are coupled buyer terminals 102a and b and seller terminals 104a and b. Also coupled to Internet 106 is a gateway (not shown) to a mobile phone network 202 (or, more generally, any mobile communications network) which communicates with a mobile station 206, such as a phone handset, using base transceiver station 204.

Also coupled to Internet 106 is a system web server 208, which in some embodiments may additionally or alternatively comprise a wireless application protocol server for mobile phone network 202. Web server 208 receives URL (Uniform Resource Locator) web page requests from buyer and seller terminals 102 and 104 and returns the requested web pages for processing by terminals 102 and 104 for generating user interfaces to display or otherwise output user data and to accept user inputs. The web pages are stored in web server code storage area 208a, although for many of the web pages data for the pages is provided from a transaction server 210 and the code in storage area 208a simply provides a presentational interface for data input to and output from the server 210

As will be understood by those skilled in the art web pages stored in web server code storage 208a may comprise code, such as Java script, or a Java applet for implementing user interface functions. Web server 208 broadly speaking provides a user interface to underlying data and application software. Thus the system functions requested by buyer and seller terminals 102 and 104 will generally be implemented by applications software and the results formatted by web server 208 to provide a user interface, for example, in HTML or WML (Wireless Mark up Language).

System functions are implemented by a transaction server 210 comprising code storage A for implementing system functions such as transaction management and underwriting functions. Service provider terminal 116 is coupled to transaction server 210 for system management and administration. An e-mail server 212, including e-mail code storage 212a, is coupled to transaction server 210 and also to Internet 106.

As a skilled person will appreciate in practice web server 208, transaction server 210 and e-mail server 212 may all be provided on a single machine. Transaction server 210 is coupled to a transaction database 214 which is described in more detail below. A storage device, illustratively shown by floppy disk 216, may be used to store code from code storage areas 210a and 212a, and/or data from or for transaction database 214.

Web server 208 communicates with transaction server 210 by conventional means such as CGI (Common Gateway Interface) script or by using JSPs (Java Server Pages). In use, URL requests from terminals 102, 104 are sent to web server 208 which in turn initiates further calls to transaction server 210 for performing a requested function. Transaction server 210 then returns data to web server 208 which is formatted as HTML web page data for interpretation and display by terminals 102 and 104. Mobile phone network 202 may be employed to provide an alternative buyer and/or seller user interface to the system or may be used to provide notifications from the system to buyers and/or sellers, or vice versa, without the need for Internet access.

Not shown in FIG. 2, but present in some embodiments, is a digital signature verification system, in communication with transaction server 210 and a digital signature database, for providing digital signature services to buyers and sellers through buyer terminals 102a, b and seller terminals 104a, b. This may be used, for example, for security, authentication and to provide non-repudiation of agreed (and digitally signed) transactions.

Figure 3:
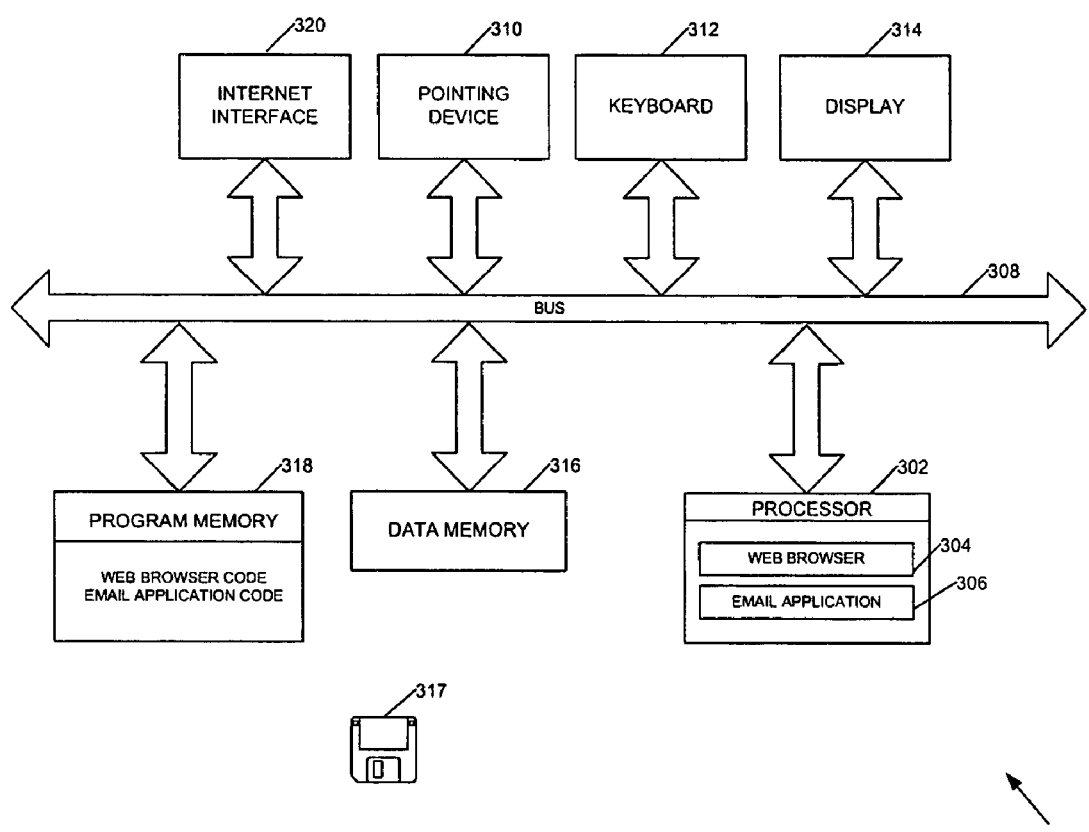
FIG. 3 shows a block diagram of a computer terminal for use with a transaction management system.

Referring now to FIG. 3, this shows a general purpose computer system suitable for use as a buyer or seller terminal for the embodiments of FIGS. 1 or 2.

A processor 302 is coupled to a general purpose computer system 300 and data bus 308, to which are also coupled a display 314, a keyboard 312, a pointing device 310 such as a mouse, and an Internet interface 320, such as a general purpose modem. Also coupled to bus 308 is a program memory 318 and a general purpose data memory 316. Code and/or data from or for these memories may be stored on removable storage such as floppy disk 317. Program memory 318 stores web browser code and e-mail application code which is loaded and implemented by processor 302 to provide a web browser 304 such as Microsoft Internet Explorer (trade mark) and an e-mail application 306 for sending and receiving e-mail notifications. Program memory 318 may comprise permanent program memory such as a hard disk; data memory 316 may comprise, for example, RAM.

Referring again to FIG. 2, the transaction database 214 stores data relating to buyers and sellers registered with the system as well as underwriting data.

For ease of understanding the operation of the transaction management system will be described with reference to a specific example of the system's use, that of providing temporary secretaries to employers. However use of the system is not restricted to this application.

In this exemplary application the sellers are the temporary secretaries ("temps") and each seller is initially allocated to one of eight grades, based upon their skills and experience. By default a new seller (or temp) starts in the lowest entry level grade. Each grade has an associated set of minimum requirements for a seller (or temp) to be classified at that grade. For example, for a temp to be allocated grade 1 might require a minimum of 100 hours experience with a minimum of four employers, 15+words per minute typing, no more than 3 complaints, no more than four in ten missed log-ins allowed and no more than 10 in 20 job turn-downs allowed (these latter requirements are described in more detail later). To be classified at grade 2 a temp might need a minimum of 250 hours experience with a minimum of 6 employers, 20+words per minute, basic skills in Word, Excel and PowerPoint (Registered Trade Marks), no more than 3 complaints, no more than 3 in 10 missed log-ins, and no more than 6 in 20 job turn-downs.

The requirements for each grade are stored in the system database together with, for each temp, the number of accrued hours of experience, the number of different employers, the seller's certified skills, complaint data, data relating to the number of missed log-ins, and data relating to the number of jobs declined (the requirement for a minimum number of different employers helps reduce the risk of fraud or bias in data, such as complaint data, which originates from a buyer rather than a seller).

The system logs details of jobs accepted by a seller, and thus keeps track of the number of hours worked by a temp and the number of different employers the temp has had. The system also monitors the number of missed log-ins, jobs declined, and complaints (which preferably lapse after a predetermined interval, which may depend upon grade) and can thus automatically promote a temp from one grade to the next providing the conditions, including the skills levels, for that grade, are met.

The contactability of a temp is important as in many instances this will determine whether or not an employer's requirement for a temp can in fact be met by the employer's deadline. Thus contactability windows are agreed by the temp with the system service provider and the temp must contact the system at some point during these windows in order to check whether or not a job has been offered to the temp. For example, the contactability windows of 2 p.m. to 4 p.m. each weekday and 5 p.m. to 7 p.m. on Saturday and Sunday might be defined. Once a temp's contactability has been agreed, the criteria for the number of missed log-ins allows for the temp's grade are applied. However, a temp with a greater contactability may charge more than one who is more difficult to contact. Similarly a seller's (temp's) grade defines the number of jobs the temp is permitted to turn down if, when the temp logs in to the system, a job offer is made. The system monitors whether a seller meets the requirements of their grade and, if they fall below the requirements, the seller is automatically demoted, although the seller may be once more promoted when his or her track record improves again.

The system may also monitor buyers, that is employers in this example, to allow sellers (temps) to be selective in who they work for and their pricing. For example, the system may grade buyers by their trading activity or number of purchases, and a seller may choose not to sell to buyers (employers) with a low level of trading activity, and to charge extra for buyers (employers) with an intermediate level of trading activity, setting a relatively lower price for buyers (employers) who can be depended upon for regular or high value purchases.

The system operator or service provider acts as an intermediary between the buyer and the seller, grading the seller or their goods or services, and adding value by guaranteeing or underwriting certain sellers and/or their goods or services. Thus the system service provider might choose to underwrite transactions in the upper grades so that, for example, for temps in grade 4 and above the system automatically compensates any employer on whom the temp defaults. In some embodiments the seller may be offered a choice as to whether or not to elect for "guaranteed" or "underwritten" status, which commands a higher price, but which imposes more onerous requirements on, for example, contactability. This is described in more detail below.

The intermediary is preferably also able to manually grade sellers, in order to override the usual automatic promotion/demotion, and also to select an appropriate entry level grade for a seller. A seller may also (manually or automatically) be allocated to different grades according to a buyer's requirements. For example, a temp could be at grade 5 for PowerPoint (Registered Trade Mark) work, but only at grade 3 for Excel (Registered Trade Mark) work if his or her lack of Excel qualifications holds him or her down.

FIGS. 4a to 4f show exemplary screen displays for a buyer terminal user interface for this use of the transaction management system in a market for temporary secretaries.

Figure 4A:

FIG. 4a shows an initial buyer enquiry screen using which a buyer (employer) can enter details of their requirements for a temp. Thus fields are provided to allow the employer to enter a requested number of temps, to define when the temps are needed, to define the requirements for the job, and to define the approximate place of work.

Referring now to FIG. 4b, this shows the result of the employer's initial enquiry to the system. There are a total of 61 secretaries available for booking for the required period and who are also contactable before the required delivery deadline. The available secretaries are graded, as described above, into one of eight grades and the top three grades are marked as "guaranteed". Should the buyer (employer) select a temp from one of these three top grades if the selected temp declines the job or misses a contactability window and so cannot be informed about the job before he or she is due to turn up, the system operator or intermediary will compensate the buyer by supplying a temp in the top, office manager grade to meet the employer's requirements. Thus, by selecting a temp in one of these three guaranteed grades the employer is guaranteed to receive a temp as requested, in the example shown in FIG. 4a, a temp with Excel skills for the period from 9.30 a.m. to 5.30 p.m. the next day. The cost of providing such a substitute temp where necessary is borne by the system operator or intermediary, and the cost of providing such compensation is recovered from other transactions made using the system.

Figure 4C:

FIG. 4c shows a screen display resulting from a buyer clicking on the offered temp grade of "senior secretary". In this grade four senior secretaries are available to meet the employer's requirements, and the price of each of these, together with a brief summary of skills, experience and other relevant factors is shown. Further details, such as a brief CV, can be obtained as shown in FIG. 4d, by clicking on a trading record request button.

Figure 4D:
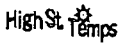

The buyer user interface of FIG. 4*d* provides a purchase request button to allow a buyer to place an order for the requested temp with the system. On clicking the purchase request button a screen display such as that shown in FIG. 4*e* is presented for completion by the buyer. In the example shown the buyer enters a reporting (or delivery) address at section 1, details of the assignment (or purchase) in section 2, reporting (or delivery) instructions at section 3, notes at section 4 and any further information, in the example shown dress code, at section 5. Once entered this information is submitted to the transaction management system and stored in data store 114 or transaction database 214.

Appropriate contract text data for a contract between the buyer and the seller is then retrieved from the data store or database and presented to the buyer, as shown in the exemplary screen display of FIG. 4*f*. In response the buyer enters a password or PIN (personal identification number) to sign the contract and the signature data is returned to the transaction management system's central server for verification. On verification of the electronic signature of the contract the purchase request is confirmed and treated as defined by the system. Where the ordered item or service is underwritten, the contract wording will generally include an undertaking by the service operator or intermediary to compensate the buyer in the case that the requested item, service or seller (temp, in the example) is not available.

Any conventional digital signature technology may be employed, such as PKI (public key infrastructure) technology or digital signature technology based upon the US Data Encryption Standard (DES). The transaction database 214 preferably, therefore, includes or is coupled to a signature verification database (not shown in FIGS. 1 or 2) and transaction server 210 (or application processor 110) preferably includes signature verification code (not shown) or a separate signature verification server is provided. It is also preferable that the digital signature aspects of the system are implemented in accordance with the requirements of applicable e-signature legislation.

Figure 5A:

FIG. 5*a* shows a screen display for a seller terminal user interface for the above-described exemplary use of the transaction management system.

Each registered seller, in the above example each temp, must log-in at some point during each window of contactability they have defined. FIGS. 4*a* to 4*f* illustrated the selection of a senior secretary, Tim Smith, by a buyer (employer). When Tim Smith uses a seller terminal 104 to log into the transaction management system, after the seller (temp) has entered a user name and password, if a purchase has been made the seller (temp) is presented with a screen display as shown in FIG. 5*a*. This screen display presents details of the purchase order including the price offered to the seller (which is less than that charged by the system to the buyer), the start (or delivery) time, details of the buyer or employer and requested service, and a confirmation deadline. The confirmation deadline is determined by the transaction management system to allow sufficient time for an alternative seller (temp) to be selected should the requested temp decline the job or miss a log-in.

In the illustrated example Tim Smith must accept the job before "15.00 hours today" or the system will select an alternative seller: To confirm acceptance of the sale the seller (temp) enters a PIN number into the web page of FIG. 5*a*, which is then transmitted back to the central system and checked against the PIN stored for the seller in data store 114 or transaction database 214.

An alternative seller user interface more suitable for a mobile phone or personal digital assistant (PDA) is shown in FIG. 5*b*. Similar basic information is supplied, namely, details of the requested service, the offered price and the confirmation deadline. The seller (temp) presses either "1" to accept the offer of "2" to reject the offer. In some embodiments of the system notification to the seller via a wireless mobile communications network may be preferred as it is easier to push data for output on a mobile phone or PDA than to push a web page onto a seller terminal. In other embodiments audio output to the seller via a mobile phone, or visual output using, for example, the GSM short message service (SMS) may be employed. An appropriate gateway into the relevant mobile phone network or networks is selected according to the mode of delivery of the notification. Confirmation of acceptance of the purchase order may simply rely upon a response from a user at the sellers telephone number (stored in database 214) or encryption may again be employed, for example, using encryption or verification services provided by a mobile phone network operator such as encryption using the GSM PIN 1 function.

Figure 5C:
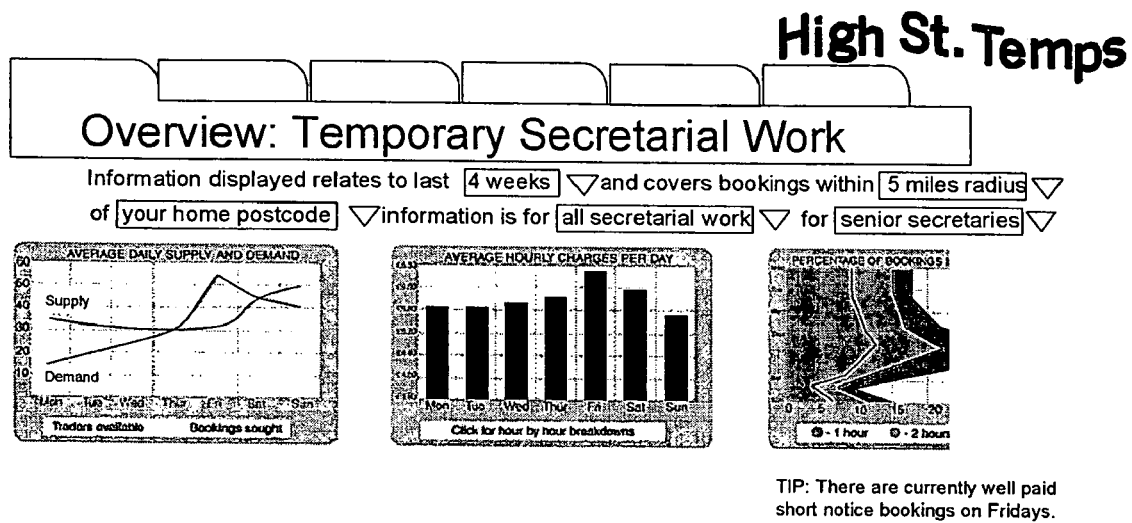

In a preferred embodiment of the system additional information is made available to the system service provider and, optionally, to sellers and/or buyers, such as information displayed in the web page of FIG. 5*c*. In the example shown this information includes supply and demand curves for the relevant market, pricing details, and details of transaction volumes. This information may be obtained by analysing data relating to past transactions stored in database 214.

As illustrated in FIG. 5*c*, this information may be selected by time, for example to select a time period for analysis. In many cases data relating to both the buyers' and sellers' locations will be available and thus the data may also be filtered by region, area or post code, as well as by type of work (or market) and, where relevant, grade. The system may also display marketing opportunities based upon an analysis of the data stored in the database, in the illustrated example, an indication that there is a particular demand or market for a certain type of work, short notice bookings on Fridays.

Figure 6:
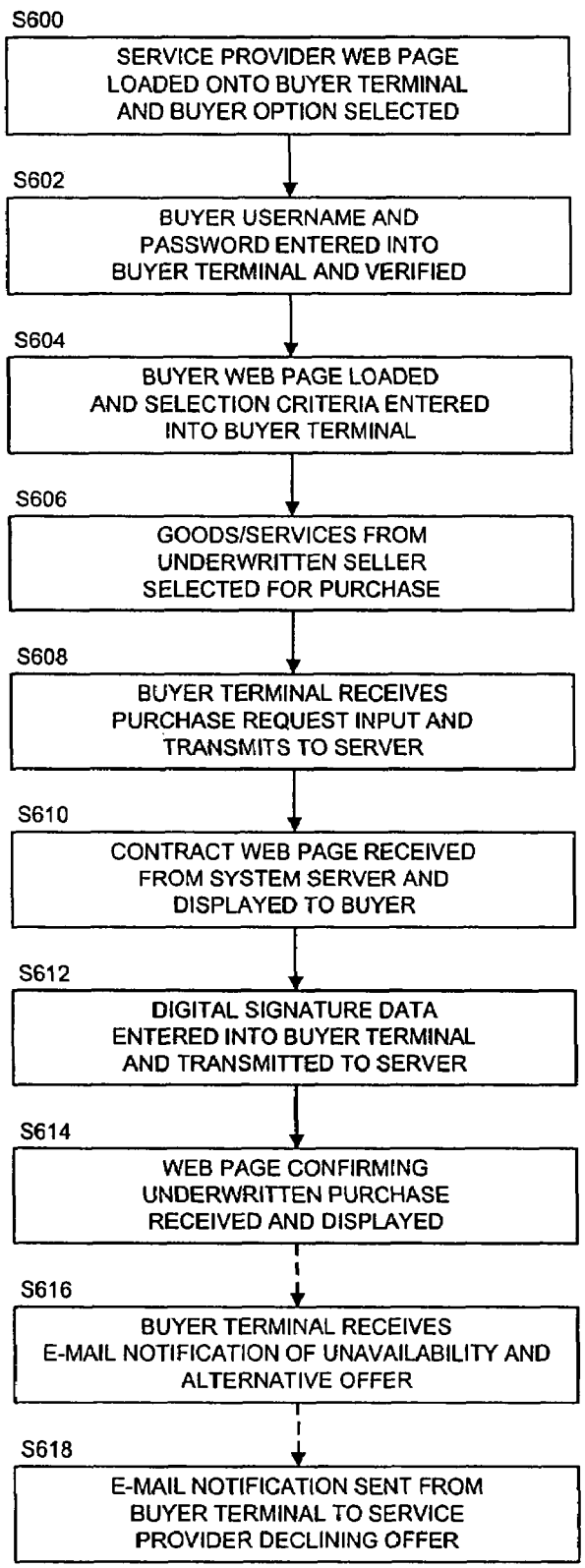
FIG. 6 shows a flow diagram of a buyer terminal procedure.

Referring now to FIG. 6, this shows a flowchart of a buyer terminal procedure for purchasing a service or item using the transaction management system of FIGS. 1 or 2. The procedure will be described with reference to the above example, to provide a concrete illustration of the system's operation, but the operation of the system is not limited to use of the system for selling the services of temporary secretaries, and can be employed for the sale of other types of service and also for the sale of goods or items of commerce, as will be briefly outlined later.

Initially, at step S600, the system service provider home web page is loaded onto the buyer terminal and displayed and the "buyer" option selected for accessing the buyer interface. The terminal then receives and outputs a web page prompting the buyer to enter a user name and password, which is then returned to the system web server 208 and verified against data stored in transaction database 214. The procedure then, at step S604, loads and displays the buyer web page to the user. This initial buyer web page comprises, in the example described above, the buyer enquiry web page shown in FIG. 4*a*. This presumes that the buyer has already registered with the system. A new buyer who is not yet registered with the system may, at step S602, choose to load an exemplary web page, such as that shown in FIG. 4*a*, to examine the goods or services on offer. However, no purchase may be made until the buyer has registered details including a name and password, payment details, for example a credit card number, and preferably a buyer address. In some embodiments this registration procedure may be carried out off-line using service provider terminal 116, for increased security.

At step S604 the buyer enters selection criteria into the buyer terminal and, at step S606, goods or services meeting the criteria are transmitted as a web page to the buyer terminal and displayed, in a similar format to that of FIG. 4b. Preferably both underwritten or "guaranteed" and non-underwritten goods and/or services are displayed together with an indication of which goods or services are underwritten or guaranteed by the intermediary. As described with reference to FIGS. 4c and 4d, the buyer may drill down through the displayed data to extract further details of the goods or services on offer. The flowchart of FIG. 6 illustrates the procedure where guaranteed or underwritten goods or services are selected for purchase at step S606, although the procedure in the case of non-underwritten goods or services is similar.

At step S608 the buyer terminal receives a purchase request input (sometimes called a purchase order), for example by the buyer clicking on the "click for contract" button of FIG. 4d for a selected service or item. This request is transmitted to system server 208 and thence to transaction server 210 which retrieves a corresponding contract for the seller from database 214 and returns this for display to the buyer at step S610. Then, at step S612, the buyer digitally signs the contract, entering digital signal data into the buyer terminal, which is then transmitted to the central server for verification. By signing the contract the buyer effectively confirms the purchase request. This digital signature provides additional security and reassurance to system users although since the buyer's username and password have already been checked (at step S602), further confirmation of the transaction authenticity is not strictly speaking necessary.

Following verification, at step S614 the buyer terminal receives and displays a web page confirming the underwritten purchase. This may be printed out by the buyer and effectively constitutes the system's guarantee to the buyer that the underwritten item or service will be delivered as requested or, if for reasons outside the service providers control such delivery is not possible, compensation will be provided. The system may immediately confirm all purchases whether underwritten or not or, in other embodiments, a purchase of non-underwritten services or goods may only be confirmed to the buyer once the seller has been contacted to confirm availability of the requested services or goods.

Where the requested item or service is not available the procedure continues with step S616. In the illustration given above this can occur, for example, where the requested temp does not log into the system to check for a purchase request during their specified contactability window. At step S616 the buyer terminal receives e-mail notification of the unavailability of the selected service or item together with the offer of an alternative, and normally better service or item as a replacement. In other embodiments notification may be made using other communications means, such as a telephone call, fax, SMS message, pager alert, or the like, or a combination of these communications methods may be employed.

In a preferred embodiment of the system the e-mail notification includes a deadline by when the buyer must reject the offer of an alternative, and the buyer's response defaults to acceptance. If the buyer does not wish to accept the alternative offer, at step S618 a return e-mail notification is sent from the buyer terminal to the service provider declining the offer, in which case the buyer is offered a refund and, where appropriate, an additional sum as compensation for any inconvenience. Again, in other embodiments of the system, the reply from the buyer back to the service provider may use other forms of communication, for example a touch-tone mobile phone in conjunction with an audio menu system.

Payment for the purchased goods or services may be made off-line by conventional means or, in alternative embodiments, the application processor 110 of FIG. 1 or transaction server 210 of FIG. 2 may be coupled to a payment system (not shown in FIGS. 1 and 2), for example by means of a telephone line, to allow on-line payments to be made. In these embodiments a buyer registers his or her credit card details with the system which are then stored in data store 114 or transaction database 214 in readiness for future transactions. When a transaction is confirmed the system then sends payment data, for example a credit card number and expiry date, to the payment system and receives back an authorization code confirming payment. Generally the system service provider themselves will have registered with the payment system beforehand to enable payments to be made in this way.

Referring now to FIGS. 7a to d, these show a flowchart of a procedure for code for transaction server 210 complementing the buyer terminal procedure of FIG. 6. The procedure illustrated in FIG. 7 relates to a purchase made from a single buyer terminal but, in practice, the central server will handle transactions between a plurality of buyers and sellers in parallel, for example using multi-threaded programming techniques.

At step S700 the service provider home web page is requested by a buyer terminal and transmitted to the terminal, by web server 208, for display to a buyer. Then, at step S702, the buyer's user name and password is received from the buyer terminal and checked against pre-registered buyer data in database 214 to verify the buyer's identity. The system also retrieves data relating to the buyer at step S702, such as data relating to any complaints made against the buyer and data relating to the buyer's transaction history such as an average value of purchases and a quantity of purchases. This data may be needed at a later stage since sellers may have placed restrictions on the types of buyer to whom they wish to offer their goods or services.

Following this, at step S704, web server 208 retrieves the buyer enquiry web page described above with reference to FIG. 4a from storage 208a, and transmits this to the buyer terminal. At step S706 the system web server 208 receives buyer enquiry data from the buyer terminal 102, the data comprising the buyer's selection criteria for selecting a service or item offered by the system. The buyer enquiry data will typically comprise a delivery date and/or time for a requested service and, optionally, a (buyer) confirmation deadline indicating by when the buyer requires confirmation from the system that their request can be met. For example, a prospective employer (buyer) may specify confirmation by no later than, say, 4 p.m. that a temp will be available the following day. Depending upon the implementation of the system some further details concerning the required item or service may also be needed, in the example shown in FIG. 4a general skills requirements for the temp and an approximate location of the employer's place of work. The buyer enquiry data received by web server 208 is forwarded to transaction server 210 for further processing.

At step S708 the system transaction server 210 logs the enquiry date and time and other enquiry data in transaction database 214. This data is then available for both processing the immediate request and for future analysis for marketing purposes. The transaction server then, at step S710, determines an internal confirmation deadline using the buyer enquiry data, this being an internal deadline for use by the system in confirming availability of the requested service or item; it is generally not transmitted to the buyer.

To determine the internal confirmation deadline the system must first determine the buyer's "external" confirmation deadline, which may either be the confirmation deadline input by the buyer or may be determined in some other way, for example, based upon the buyer's requested delivery date and/or time. Thus the external confirmation deadline may be set substantially equal to the delivery date/time or it may be set in advance of the delivery date/time to provide confirmation by the end of the preceding working day for a delivery due the next day.

Once the buyer's (or "external") confirmation deadline has been determined the internal deadline is set at the external deadline less a margin factor, for example, 50% of the time available. This allows the external deadline to be treated as an absolute deadline and the internal deadline to be moved on in the event that the requested service or item is not available.

By choosing a margin which is a percentage of the time available, that is, a percentage of the difference between a current date/time and the external confirmation date/time, if an item or service is not available there is still some time for finding a replacement. However, on each occasion that the internal deadline is pushed back the margin becomes smaller.

The internal deadline is also chosen taking into account the contactability of sellers of the requested service or items and it should not be set later than the latest possible contactability deadline for sellers of the requested service/items or for an individual seller, in embodiments where such an individual seller is specified by a buyer.

In the exemplary buyer interface web page of FIG. 4a there is no provision for a buyer to enter their own confirmation deadline. As illustrated a temp has been requested for the following day and, in this case, the system sets an external (buyer) confirmation deadline of 4 p.m. the preceding working day. Assuming, for example, that the prospective employer has logged onto the system as 3 p.m. the preceding day, the margin is, in one embodiment, calculated at 50% of one hour, i.e. 0.5 hours, setting the internal deadline at 3.30 p.m. Should this deadline be missed a further internal deadline of 3.45 p.m. will be set, and so on.

It can be seen that in some circumstances, where one seller drops out or is not contactable, very little time may remain to find a replacement. It is therefore desirable that some sellers are available who can respond virtually instantaneously, although these sellers will be able to charge a greatly increased price. This price is borne by the intermediary but is reflected in the higher price of "guaranteed" temps offered by the system.

At step S712 the transaction management system transaction server 210 selects available sellers of the requested service or item from transaction database 214 using the internal confirmation deadline, buyer enquiry data, and buyer data. The requested service or item may be assumed, where no specific service or item is specified, to be of a general type offered by the particular embodiment of the system, in the example presently discussed, temporary secretaries. The selected sellers must be contactable not later than the internal confirmation deadline and the system therefore excludes those sellers (temps) not contactable before this deadline. The buyer data may be employed in embodiments where sellers are permitted to select which buyers or types of buyers they wish to sell to. For example, a temp may only wish to provide services to companies over a specified size or companies who have a track record of employing temps.

The buyer enquiry data may or may not include price data but, generally, sellers will be selected from database 214 over at least a band of prices. The seller price data in transaction database 214 may define prices which depend upon buyer characteristics, for example, to offer discounts to buyers (employers) who are reliable sources of work.

Once the transaction server 210 has selected available sellers (temps) matching the buyer enquiry data, this information is passed to web server 208 which formats the data as a web page and, at step S714, transmits the web page to the buyer's terminal 102. The web page provided for output to the buyer includes goods or services for selected sellers, in this case, temps, and corresponding prices. As illustrated in FIG. 4b the services or items for sale may be graded into one of a plurality of bands.

Preferably the system selects and outputs both underwritten or "guaranteed" and non-underwritten services/goods/sellers, indicating which of the available services/goods/sellers are guaranteed, and which are not. Thus, in the example shown in FIG. 4b, secretaries in the three top grade bands are guaranteed or underwritten. Should an employer select a temp in one of these top three grades, where it later turns out that the selected temp is not contactable or declines the job offer the employer will be compensated, either monetarily or, preferably, by the offer of a top-grade temp at the same price to work during the same period. In other words, an employer selecting a temp in one of these top three grades can be guaranteed that someone, either the selected temp or a top-grade temp, will turn up, in the example of FIG. 4a next day, to meet the employer's needs.

In practice step S714 may comprise the transmission of a plurality of web pages as illustrated in FIGS. 4b to 4d, to allow a buyer to first of all view the goods/services on offer at a high level and then to view further details regarding a subset of the offers and, eventually, to select a service or item for purchase, in the illustrated example a temp, Mr Tim Smith.

The prices of the goods/services/sellers on offer will generally depend upon delivery time or the "external" confirmation deadline—that is, shorter notice requests will generally be charged at a higher price. The price will also depend upon the status of the seller's offer, in particular, whether or not it is underwritten or guaranteed. The purchase of a guaranteed product will again usually be more expensive since the system operator will need to recoup their losses for those instances where a "guaranteed" temp does not turn up by charging more.

The additional charges will generally be across all the guaranteed sellers/services/items but these may be spread across guaranteed and non-guaranteed sellers/services/items. The determination of this mark-up is described in more detail below. The system operator will also generally wish to include a further mark-up for their own profit.

The grading or banding system under which attempts operate has been broadly described above. When data for a temp is entered into transaction database 214 the secretary must attest to their skills certification levels and experience and an initial grade, not generally underwritten, is allocated accordingly. As a temp accrues more experience, logged as transactions using the system, the temp is promoted up through the grades, providing that certain criteria are met. These criteria define a minimum number of missed log-ins to check for job offers (as described further below), a minimum number of job turn-downs and, optionally, a minimum number of different employers.

The highest, underwritten grades, are permitted very few missed log-ins and job turn-downs and require a great deal of logged experience with a large number of different employers. Preferably missed log-ins and job turn-downs are deleted from the system after a period of time (which may depend upon grade) has elapsed, as otherwise more experienced temps would accrue a larger number of missed log-ins, etc., than less experienced secretaries simply by virtue of the longer period for which they had been monitored.

At step S716 the system web server 208 receives a purchase request from the buyer terminal 102 and forwards purchase request data to transaction server 210. In one embodiment a buyer makes a purchase request by selecting one of the offers transmitted to the buyer terminal at step S714 for output to the buyer. In this embodiment the purchase request inherits data identifying the selected option, such as, for example, the name of the temp, together with other data from the buyer enquiry such as delivery data and, if applicable, a buyer confirmation deadline.

In a preferred embodiment payment data is pre-registered with the system by buyers before a purchase request is entered so that, once a buyer has been identified (step S702) there is no need to request this data again.

For the purposes of illustration the flow diagram of FIG. 7 continues presuming that the service/item/seller selected is a guaranteed or underwritten offer from the system.

Figure 7A:
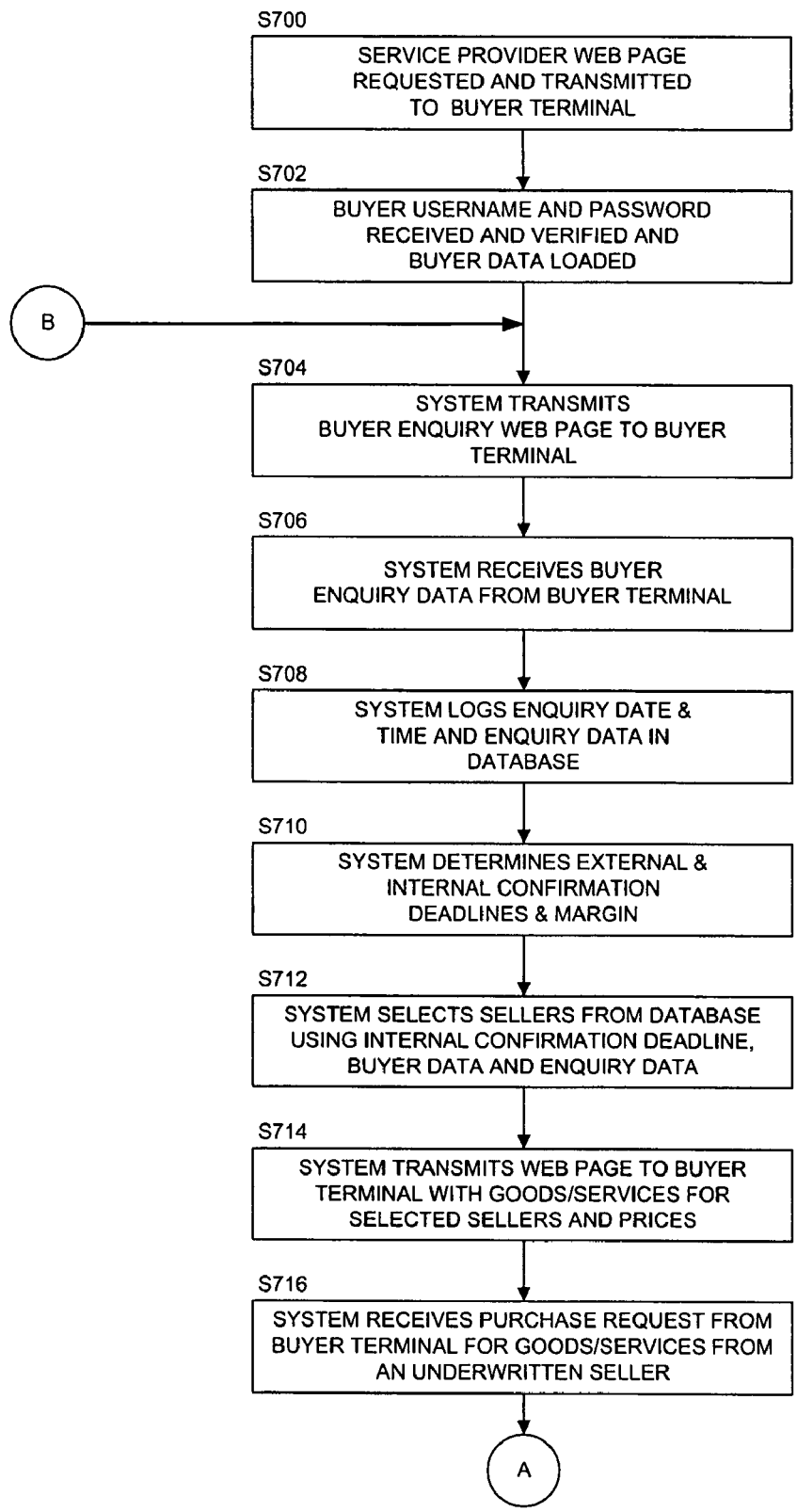
FIGS. 7a to 7d show a flow diagram for a transaction management system server process.
Figure 7B:
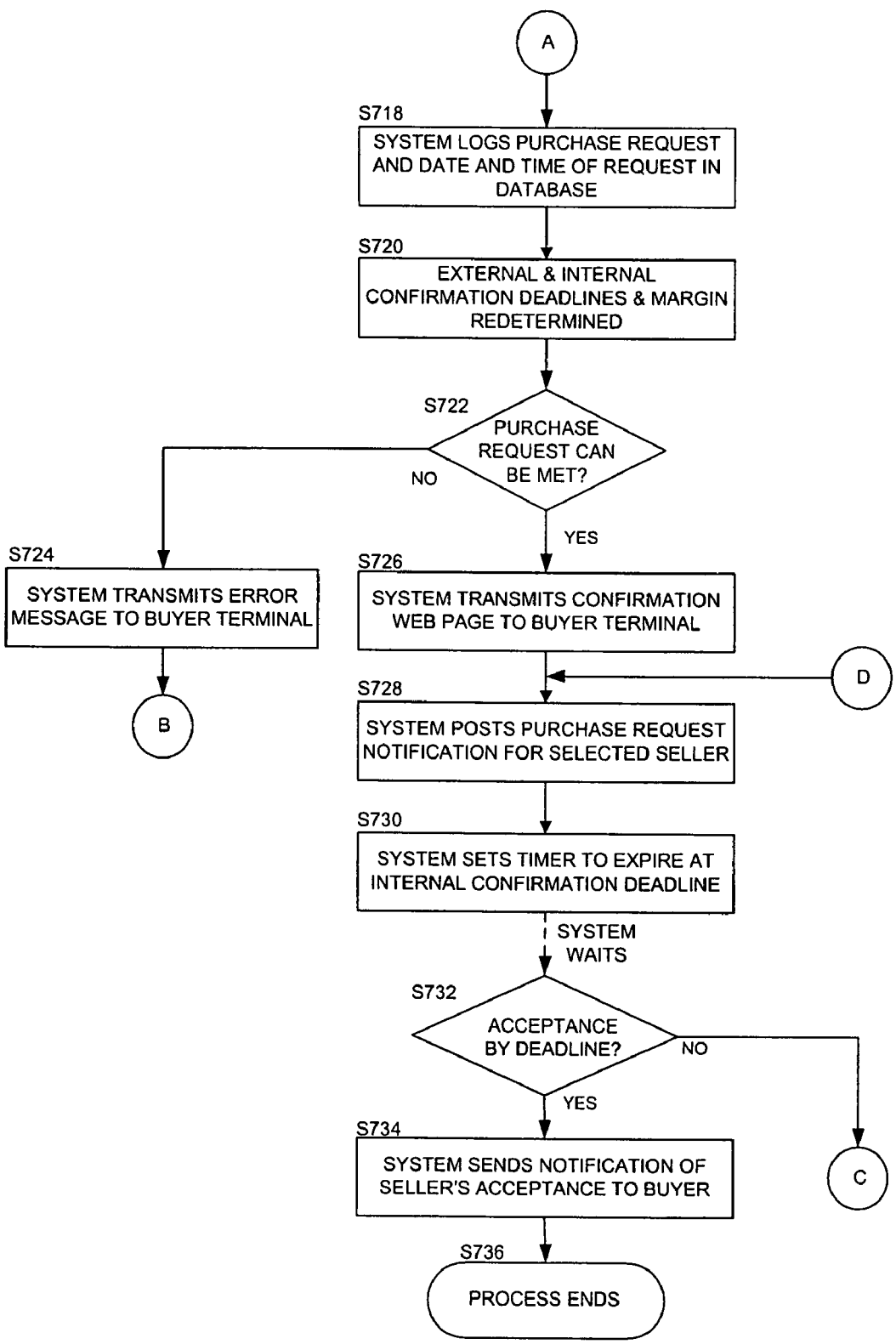
Figure 7C:
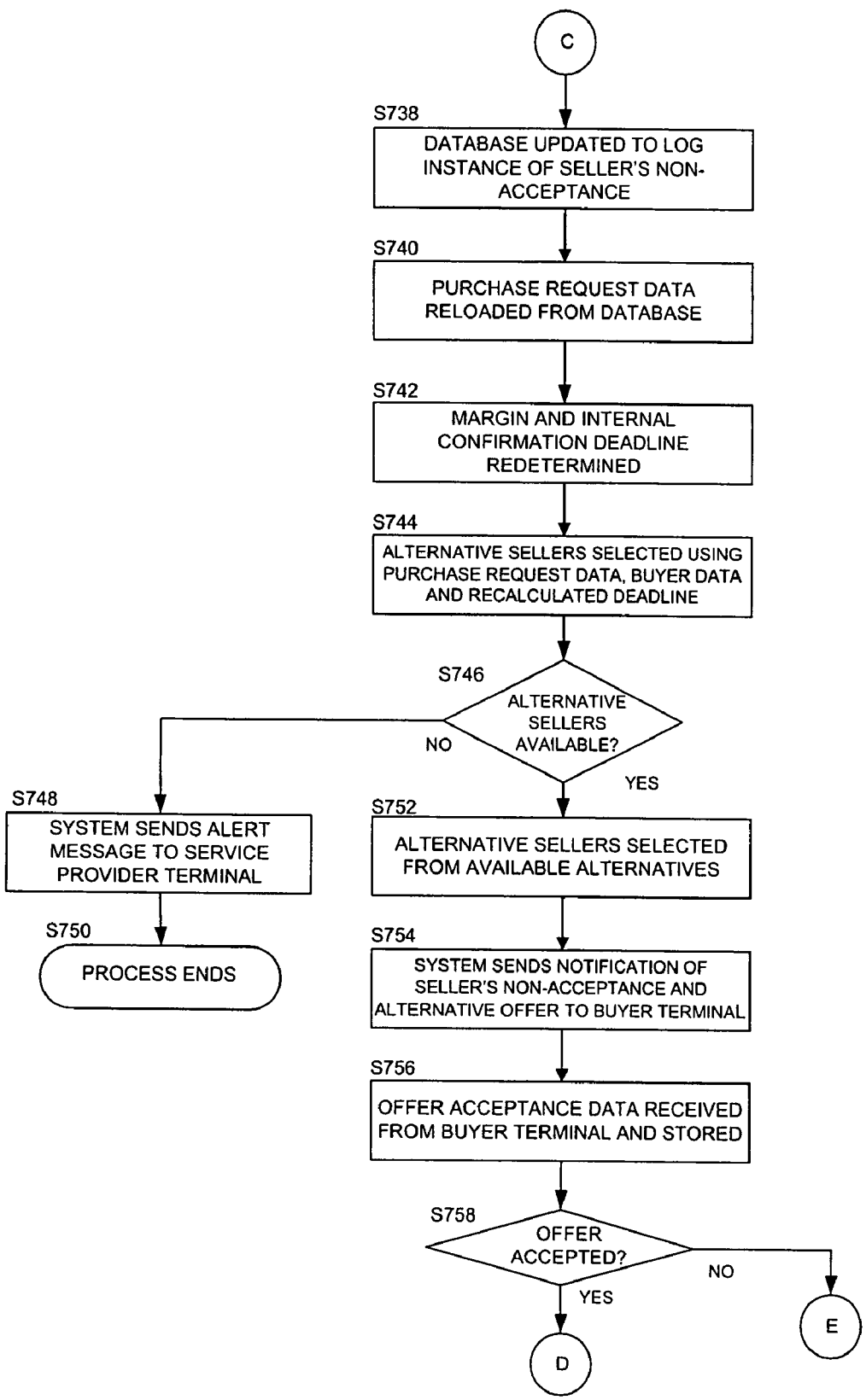
Figure 7D:
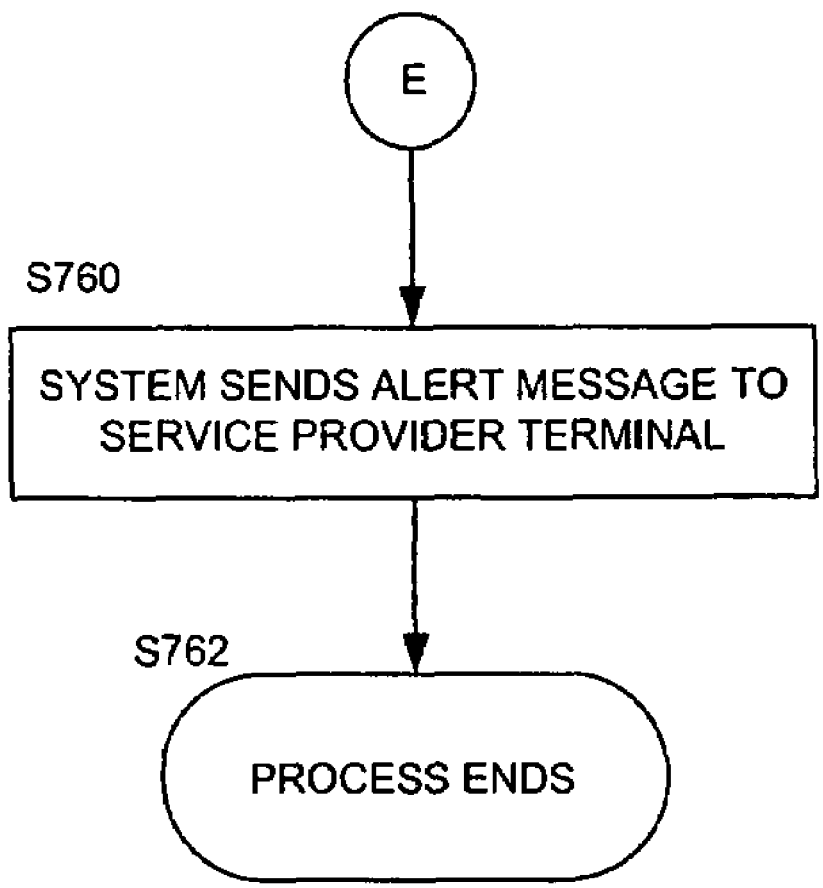

Referring now to FIG. 7b, the process continues at step S718, at which transaction server 210 logs the purchase request, and the time and data the request was received, in database 214. Then, at step S720, the external and internal confirmation deadlines and time margin are checked and if necessary re-determined since, in some embodiments, these may have altered from those specified in the original buyer enquiry. In particular, the internal confirmation deadline may have changed if a significant period of time elapsed between the original buyer enquiry and final placement of a purchase request. Thus, at step S722, the system checks whether or not the purchase request can still be met since, if the internal or external deadline has changed it may no longer be possible to contact the requested seller (temp) in time.

If the internal confirmation deadline has changed so that it is no longer possible to contact the requested seller but it is still possible to contact the seller before the buyers (external) deadline the system may set the internal deadline to be substantially equal to the deadline for contacting that seller. In this way a prospective buyer is not refused a sale on the basis of a partially arbitrary internal confirmation deadline.

If, at step S722, it is determined that the purchase request cannot be met, for example because the selected service or item is no longer available in time, the system proceeds to step S724 and transmits an appropriate error message to the buyer terminal for example, by transmitting a web page to the terminal indicating the reason for the error and/or sending an e-mail to the buyer terminal. The system then returns to step S704 for the buyer to update their enquiry data to select an alternative service or item or seller.

If, at step S722, the purchase request can still be met the system transmits a purchase confirmation web page to the buyer terminal (step S726) and, at step S728, notifies the selected seller, in the presently described example, the selected temporary secretary, Mr Tim Smith. The selected seller may be notified using any convenient communications means or a plurality of communications means.

Preferably details of the buyer's purchase are posted on the sellers web page, that is, on a web page including data specific to the seller, which the seller accesses by logging into the transaction management system. Preferably the system also sends an e-mail to the selected seller including details of the sale. Other forms of notification such as the GSM short message service, a pager signal and a conventional telephone call may also be employed (as is generally the case with notifications from the system to buyers and sellers). The procedure followed by a seller, in this example a temp, to check for and accept or reject a sale, in this case an assignment, is detailed more fully below.

Once details of the sale have been posted on the system web site, on the appropriate seller's web page, at step S730 the transaction server 210 sets a timer to expire at the internal confirmation deadline associated with that purchase request. The system then waits for the identified seller to log in and either accept or decline the offer, although a so-called "guaranteed" seller will, in practice, need to accept virtually every purchase request offered in order to retain guaranteed status.

Once the timer has expired (or, alternatively, once the seller has responded to the notification at step S728) the system checks, at step S732, whether or not the seller has accepted the sale by the confirmation deadline. If the seller has accepted the sale, i.e. the temp has agreed to take the job, in this example, the system then, at step S734, sends notification of the seller's acceptance to the buyer, for reassurance, and the process ends at step S736. As with the notification to the seller at step S728, any convenient means of communication may be employed. If, however, at step S732 the seller has not accepted the sale by the (internal) confirmation deadline, for example because the seller (temp) has not logged in when they said they would or because the sale (employment offer) was declined, the process continues at step S738 and transaction database 214 is updated with details of the seller's non-acceptance.

If the originally-identified seller has not accepted the sale, at step S740, the buyer's purchase request data is retrieved from transaction database 214 and, at step S742, the time margin and internal confirmation deadline re-determined based upon the now current date and/or time. Thus if, for example, the originally-identified temp, Mr Smith, did not accept by the internal deadline of 3.30 p.m. a new margin of 15 minutes and a new internal deadline of 3.45 p.m. is set at step S742. Then, at step S744, the system selects alternative sellers from transaction database 214 using the buyer's originally entered purchase request data, the recalculated internal deadline and, as previously in step S712, the buyer data where appropriate.

Broadly speaking at step S744 the system is aiming to identify an alternative service/item/seller to replace the guaranteed product the buyer originally requested. In a market for temporary secretaries, at step S744 the system, for example, attempts to locate any secretary contactable by the recalculated internal deadline at the same or a higher grade than the buyer's original selection, and preferably in the top grade. Thus the selection at step S744 is preferably made without reference to price.

At step S746 the system determines whether or not any alternative sellers are available. If no alternative sellers are available, at step S748 the system sends an alert message to service provider terminal 116 urgently notifying the system service provider that a "guaranteed" transaction will potentially fall through, allowing the system service provider to manage this exception off-line. The software process then ends at step S750.

If one or more alternative sellers—in this case, temps—are available then, at step S752, an alternative seller is selected from those available for example, by selecting the earliest contactable seller or highest graded seller, and, at step S754, the system sends notification of the originally identified seller's non-acceptance to the buyer together with the system's determined alternative. Preferably notification to the buyer is by means of an e-mail sent by e-mail server 212 rather than by, for example, posting notification on a web page which the buyer may not read. However, in other embodiments e-mail communication may be combined with other forms of communication, for example, an SMS message to a mobile phone alerting the buyer to inspect their web page because changes have been necessary to the agreed transaction.

In some embodiments before the system sends notification of an alternative offer to the buyer the alternative seller is first contacted to confirm that the alternative is, in fact, available.

At step S756 offer acceptance data is received back from buyer terminal 102 for example, by e-mail notification from the buyer to the system, and this data is provided to transaction server 210 for storage in database 214. Broadly speaking, steps S754 and S756 correspond to steps S616 and S618 of FIG. 6.

At step S758 the transaction management server reads the acceptance data to determine whether or not the buyer accepted the alternative offer. If the offer was accepted the process then continues again at step S728, notifying the alternative selected seller of the buyer's purchase request and, at step S730, setting a timer to expire at the revised internal confirmation deadline. It can be seen that the process continues in a loop via steps S732, S738, S746, S752 and S758 until an alternative service/item/seller is found or until no alternatives are available. However if at step S758 the system's offer of an alternative to the buyer is not accepted then, at step S760, an alert message is sent to the serve provider terminal 116 again alerting the system service provider that a "guaranteed" service/item/seller, in the example a guaranteed temp, is not available and that the system's proffered alternative in compensation has been rejected. The process can then be managed off-line by the system service provider's customer service staff, and the software process again ends at step S762.

Although the process has been described with reference to a buyer selecting a guaranteed seller, in particular, an identified temporary secretary, the same principles are also applicable to the sale of other services and/or goods. Similarly the system may guarantee a level of service or quality of goods on sale rather than, in the example given above, the availability of a specifically identified seller, although when implementing such a procedure the system would generally then select an identified seller offering the requested service or item of commerce, albeit without, in every embodiment, informing the buyer of the seller and/or of changes thereto.

Figure 8:
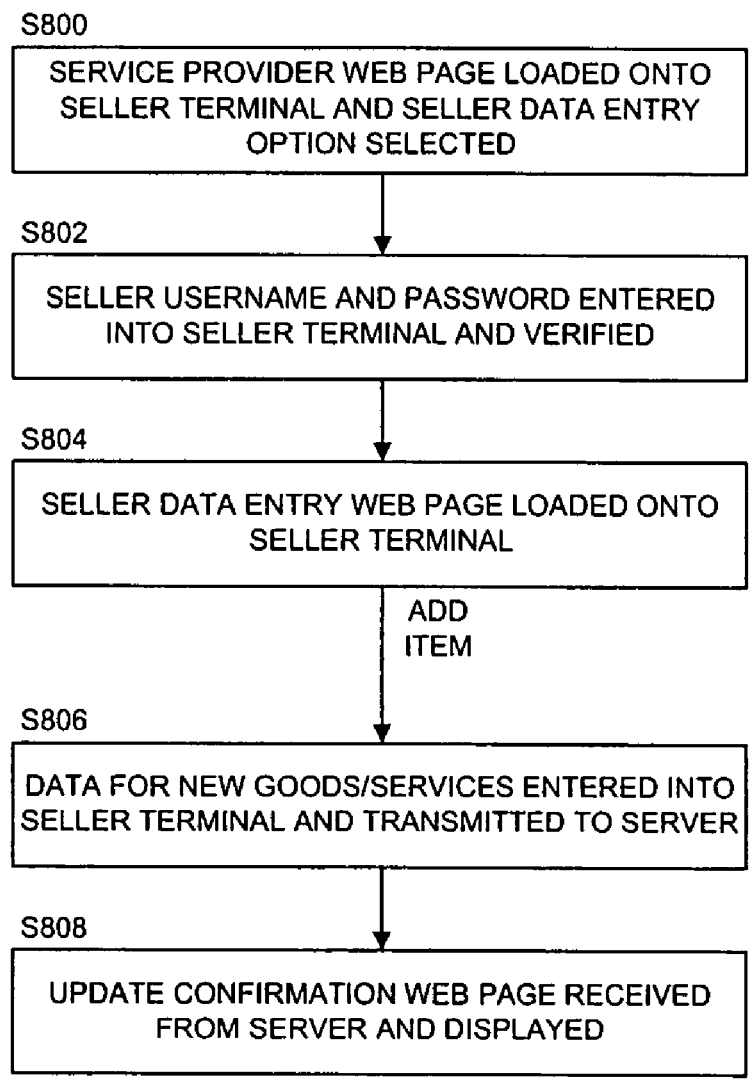
FIG. 8 shows a seller terminal data entry procedure.

Referring now to FIG. 8, this shows an exemplary procedure for steps on a seller terminal 104 for a seller entering details of services and/or items of commerce they are able to provide into the transaction management system 200.

At step S800 the system service provider main web page is loaded from web server 208 onto a seller terminal 104 and a seller data entry option provided on the web page is selected. The system responds by transmitting an access control web page to seller terminal 104 which, at step S802, is displayed on a terminal for entry of a seller username and password, which are then transmitted back to web server 208 and thence to transaction server 210 for verification. Following verification, at step S804, the seller data entry web page is loaded onto seller terminal 104 and displayed. This web page provides an interface for a seller to enter details of services and/or items of commerce they are offering into database 214, as well as menu options for amending and deleting such sale offer data.

Where a seller opts to add details of a service or item to the database, at step S806 data for the new services or goods are entered into the seller terminal 104 and transmitted to web server 208, and thence to transaction database 214 via transaction server 210. The system then reads back the data from database 214 and web server 208 constructs a web page using the retrieved data which is transmitted to seller terminal 104 for display to the user as confirmation that database 214 has been updated.

Figure 9:
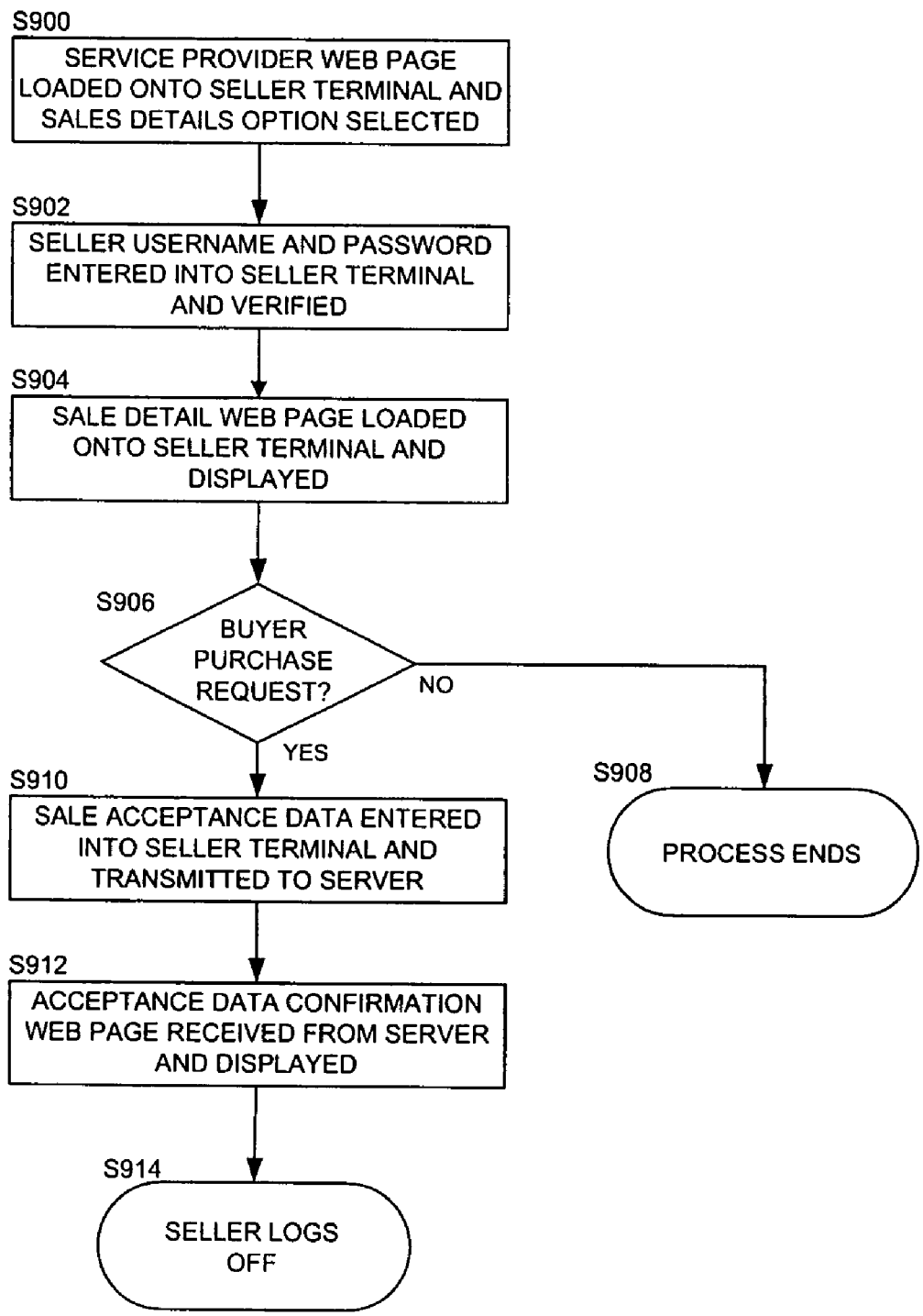
FIG. 9 shows a seller terminal purchase acceptance procedure.

Referring now to FIG. 9, this also shows a flowchart of a procedure for a seller terminal 104, for a seller to check whether or not any buyer purchase requests have been received for their goods or services. The procedure illustrated in FIG. 9 corresponds to that performed between steps S730 and S732 of FIG. 7b, in which seller acceptance data is received from a seller terminal by transaction server 210.

At step S900 the system service provider home web page is loaded onto a seller terminal 104 of a seller and a sales details option is selected. A web page requesting a username and password for the seller is then transmitted from web server 208 to the seller terminal, and displayed for seller input of the username and password which are then transmitted back to the central system for verification. Once the sellers identity has been verified, at step S904 a sale detail web page, such as that illustrated in FIG. 5a, is transmitted to the seller terminal and displayed. In other embodiments, for example where access is via a WAP-enabled mobile phone, a simplified web page such as that shown in FIG. 5b may be displayed.

The sale detail web page displayed data indicating whether or not a purchase request has been received from a buyer for that seller's goods or services. If no such buyer purchase request has been received at step S906, the process ends at step S908. If a buyer purchase request has been received the web page (or WAP page) shows details of the sale and requests confirmation of acceptance by the seller. Thus, at step S910, the seller enters sale acceptance data into the seller terminal, which is transmitted to the server and, at step S912, an acceptance data confirmation web page is received back from web server 208 and displayed on the seller terminal for confirmation of the seller's input. The seller then logs off from web server 208 (or, where access to the system is via a mobile communications network, ends the data call).

Figure 10:
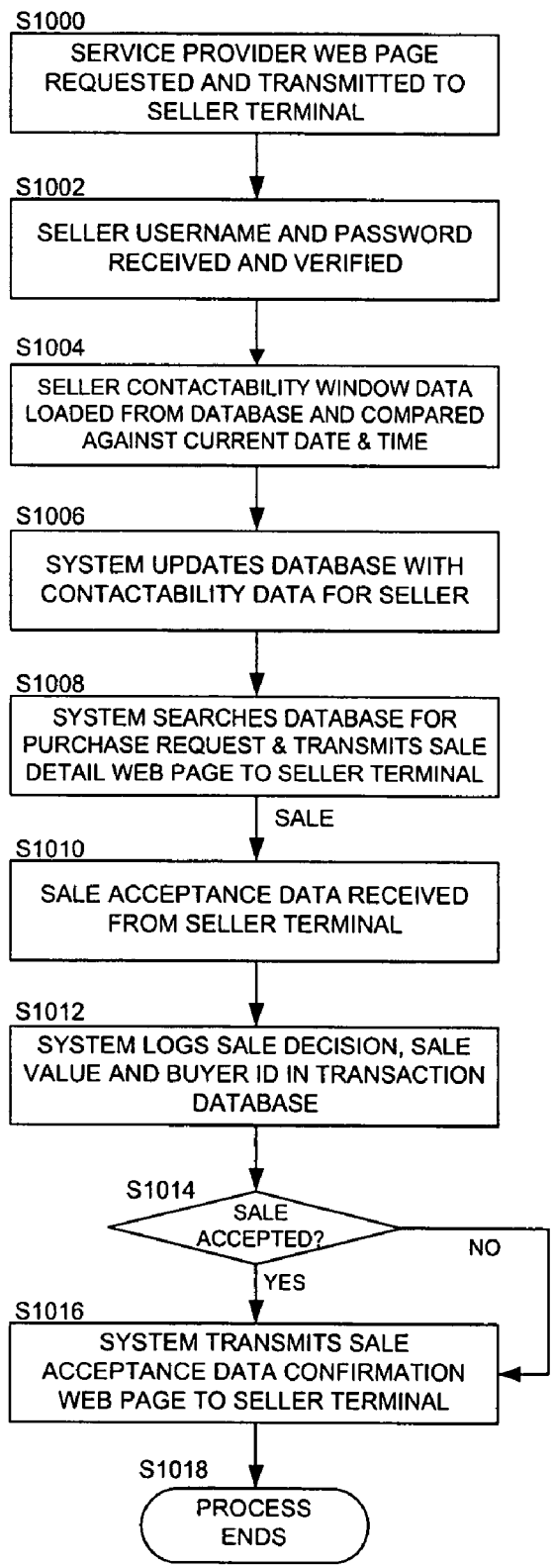
FIG. 10 shows a transaction management system server purchase acceptance procedure.

FIG. 10 shows a procedure, corresponding to that of FIG. 9, for the central transaction management server system. Thus, at step S1000, the system service provider home web page is requested and transmitted to a seller terminal 104. Then, at step S1002, a seller username and password is received from the seller terminal, and verified using transaction database 214.

At step S1004 seller data comprising data defining one or more seller contactability windows is loaded from database 214 and compared against the current date and time. The system determines whether or not the seller is accessing the system during a defined contactability window and, at step S1006, updates database 214 with corresponding contactability data for the seller. This data is used, among other things, for determining the number of occasions on which a seller fails to log in during the seller's defined contactability windows, and may also be used to identify other times at which the supplier regularly logs in and hence suggest further contactability windows for the seller.

At step S1008, the system then searches database 214 for purchase request data for the seller, loads this data if present, and generates and transmits to the seller terminal a sale detail web page as discussed with reference to step S904 of FIG. 9. In other embodiments sale details may be transmitted to a seller by other communications means such as a data or voice call to the seller's mobile phone, interactive TV or other means.

In the event that there is a purchase request for goods or services offered by the seller, the process continues, at step S1010, with reception of sale acceptance data from the seller terminal. The sale acceptance data indicates whether or not the seller accepts the buyer's purchase request, although in practice a seller who is guaranteed or underwritten will have scope to refuse very few or no buyer purchase requests.

At step S1012 the transaction server 210 logs the sale acceptance data in transaction database 214 together with further sale details including sale value and buyer identity. Then, at step S1014, the system determines whether or not the sale was accepted. If the sale was declined the process ends at step S1018. If the sale was accepted web server 208 transmits a sale confirmation web page to the seller terminal for output to the seller, corresponding to step S912 of FIG. 9, and again the process then ends at step S1018.

In other embodiments the sale acceptance data confirmation web page is also transmitted to the seller terminal when the sale is declined, to confirm this back to the seller (as described with reference to step S912 above).

Figure 11:
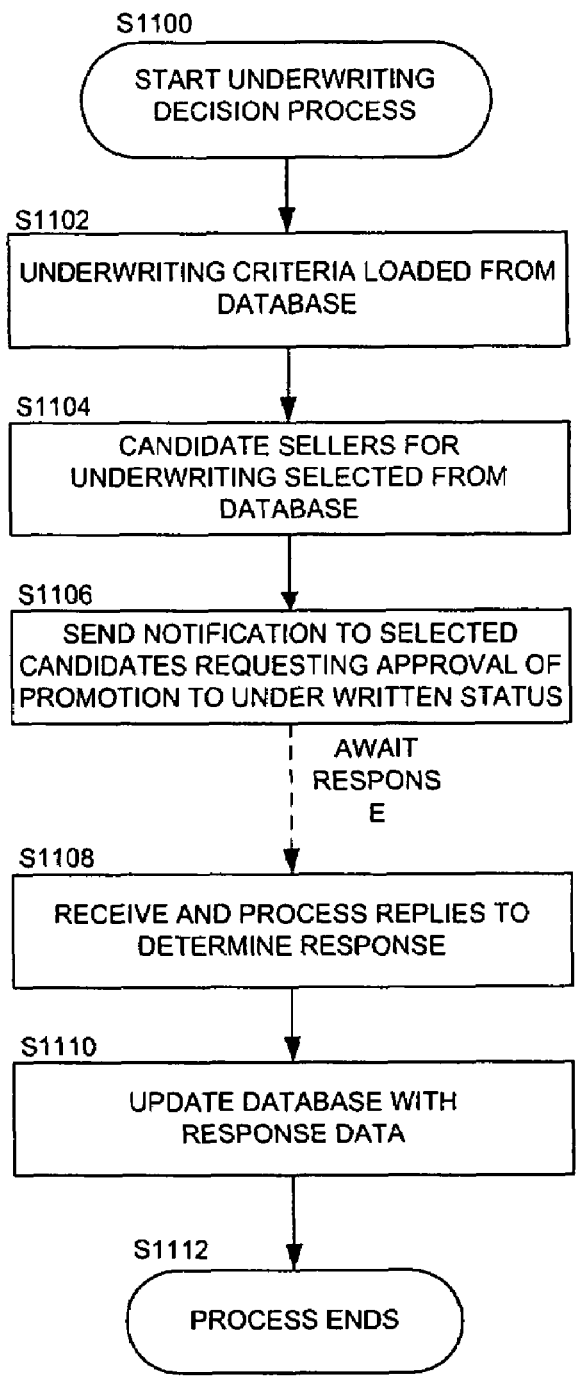
FIG. 11 shows an underwriting decision procedure.

Referring now to FIG. 11, this shows a procedure for determining which sellers and/or which services or goods they offer are to be underwritten or guaranteed by the system service provider: The process begins at step S1100 triggered either by a timer for example, to perform a regular overnight sweep of the database, or triggered by a sales threshold having been reached as determined for example, during the procedure of FIG. 7 or FIG. 10, or in some other way.

Broadly speaking, in determining which sellers/services/goods to underwrite the system is determining those sellers/services/goods for which the system service provider is willing to take on some form of liability such as the liability to pay or provide compensation in the event of an underwritten transaction going wrong or an underwritten seller defaulting on a transaction.

At step S1102 underwriting criteria for the system are loaded from transaction database 214. These underwriting criteria may be selected according to the market in which the system is operating but generally will include one or more of the following parameters:

A minimum threshold number of sales or hours of service provided;

A minimum average value of sales;

A minimum number of buyers, preferably counting only buyers associated with more than a predetermined number of different sellers (or fraud prevention);

A maximum number of complaints;

A maximum number of missed contactability windows; and

A maximum number of declined sales.

The maximum permitted threshold values preferably each have an associated time value so that, for example, a complaint instance is deleted from the database or not counted for the purposes of underwriting once it reaches a predetermined complaint age.

Once the underwriting criteria have been loaded from the database, at step S1104 candidate sellers for underwriting are selected from the database. Associated with each seller is underwriting status data comprising a yes/no flag to indicate underwritten or non-underwritten status and a time value or time and/or date combination for use with sellers who are not underwritten. This time value or time/date combination allows a seller to specify that the system should not offer underwritten status for a specified period from an initial offer or until a specified date. This is desirable for some sellers because underwriting status carries obligations which not all sellers may wish to adopt, such as an obligation to accept virtually all jobs or requests for purchase which are offered. Thus, at step S1104, the system (transaction server 210) selects from database 214 those sellers (or goods/services) who meet the underwriting criteria, who are not yet underwritten, and who have not requested exclusion from offers of underwritten status.

At step S1106 the system has a list of sellers (and/or goods or services) who meet the system's requirements for underwriting and who are potentially willing to be considered. E-mail server 212 then sends an e-mail notification to all these candidates requesting their approval of promotion to underwritten status and also explaining the associated obligations.

Responses are awaited from each candidate and, at step S1108, the replies are received by e-mail server 212 and processed to determine the sellers' responses, for example by scanning for "yes", "no", "don't ask yet" in the response. Then, at step S1110 database 214 is updated in accordance with the sellers' responses to either promote the sellers to underwritten status, or to indicate that a seller is not to be asked again about underwritten status for a predetermined period or, in the case of no response, to leave the database entry for those sellers unchanged. The process then ends at step S1112.

The "underwritten or "guaranteed" status of sellers is displayed to buyers and underwritten sellers are required by the system operator to fulfil substantially all purchase requests within their predefined acceptance parameters of price, buyer type, etc. In embodiments underwritten sellers are penalized if sales are declined or if log-ins are missed, for example, by being demoted one or more grades and/or losing their underwritten status for a period of time, for example six months.

Figure 12:
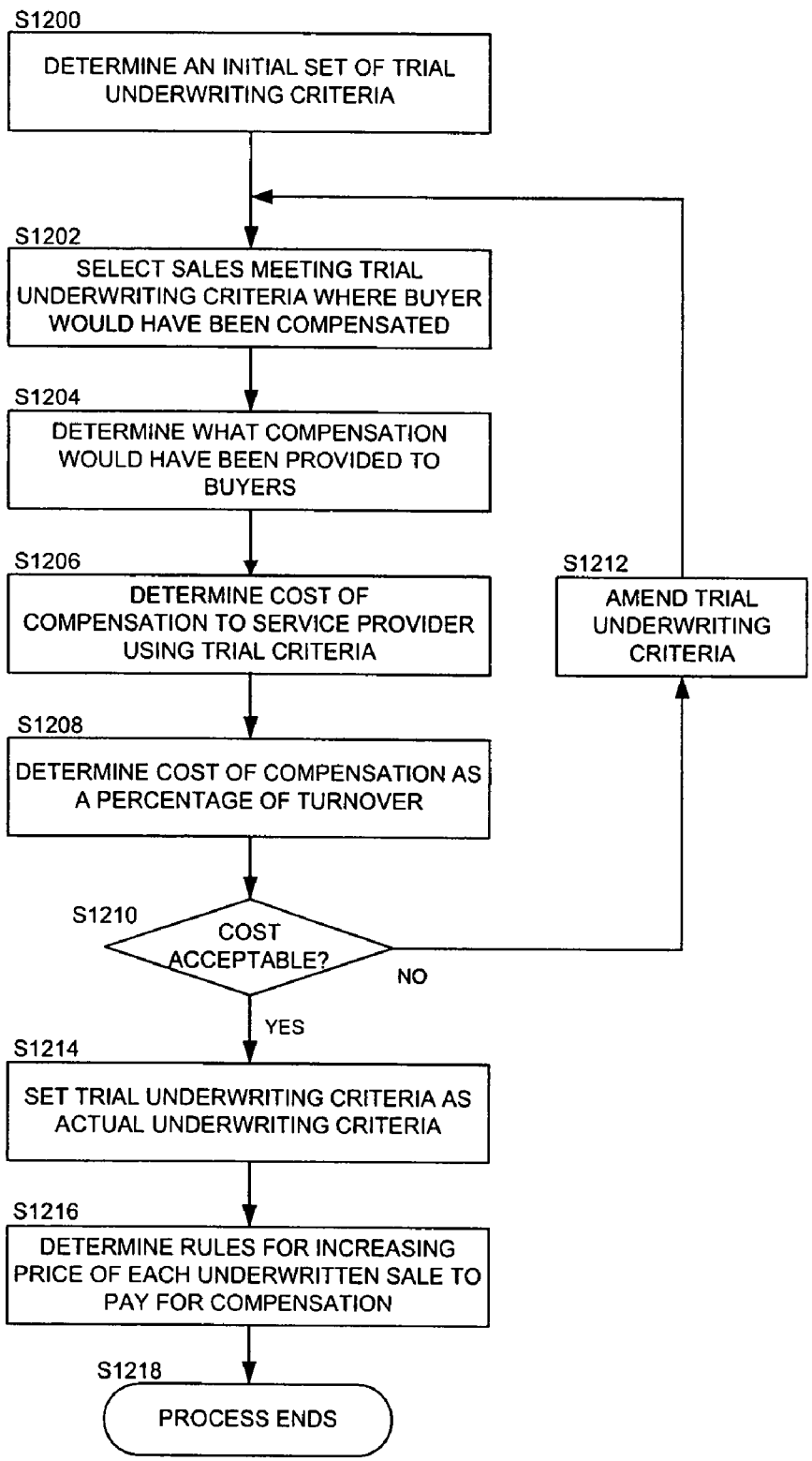
FIG. 12 shows a flow diagram of a procedure for determining underwriting threshold criteria.

FIG. 12 shows a procedure for determining a set of underwriting criteria.

At step S1200 an initial set of trial underwriting criteria is determined, for example using an expert. A typical aim might be for around 20% of the most reliable sellers to be underwritten. Then, at step S1202, transaction database 214 is interrogated using service provider terminal 116 to select sales meeting the initial set of trial underwriting criteria where the buyer would have been compensated. This determination is made using historical data stored in transaction database 214 to determine the number or percentage of transactions where the purchase request or confirmation deadline was not met. Next, at step S1204, a determination is made of the compensation which would have been provided to the buyers who would have qualified for compensation. This need only be an approximate determination and need not, for example, take into account the consequential effect of reallocating goods or services on offer amongst other prospective buyers. The determination at step S1204 may be made by estimation of what alternatives would have been provided to the buyers and by estimation of what fraction of these backup alternatives would have fallen through necessitating some form of monetary compensation.

Following this, at step S1206, a determination is made of the cost of the compensation to the system service provider had the trial underwriting criteria been in place. This can be determined by calculating the cost to the underwriter, in this case a service provider, of providing an alternative seller/item of commerce/service or monetary compensation to the buyers who would have been compensated.

At step S1208 the cost of the compensation as a percentage of the total system turnover for the relevant market sector is then found, again using historical sales data for sales brokered by the system and, at step S1210 a determination of whether or not the cost is within an acceptable range is made. If the cost is not within an acceptable range then, at step S1212, the trial underwriting criteria are amended and the process loops back to step S1202, to refine the criteria with the aim of approaching a cost which is within the acceptable range.

If, at step S1210, the cost is acceptable then, at step S1214, the trial underwriting criteria are retained for use as the actual underwriting criteria for the system. Then, at step S1216, these underwriting criteria are used to determine rules for increasing the price of each underwritten sale in order to recompense the system service provider for providing compensation. This may be a simple percentage, for example +3% on all sales or may weight the price increase so that a greater increase is applied to guaranteed or underwritten sales. The determination at step S1216 preferably also takes account of the profit the system service provider aims to make. The process then ends at step S1218.

Referring back to FIG. 2 once more the transaction database 214 stores underwriting invention data as well as buyer and seller data as follows:

Buyer Data

The buyer data stored in transaction database 214 includes:
buyer name or ID, and password;
buyer contact data e.g. telephone or pager number;
buyer digital signature data;
historical purchase-related data, such as average purchase value and complaint data (for example indicating whether and how many complaints have been made against the buyer by sellers, the service provider or others such as credit rating agencies);
buyer enquiry data for searches of database 214 for available goods/services/sellers, preferably including historical buyer enquiry data;
purchase request data, preferably including historical purchase request data, including:
date and/or time logs of buyer enquiries and purchase requests;
agreed delivery dates and/or times;
price data, preferably broken down to indicate seller's price, system operator or intermediary's quoted price, tax, delivery, etc;
seller data, where the purchase request identifies a specific seller;
optional purchase request parameters, such as a buyer's purchase request
confirmation deadline;
compensation offer acceptance data, such as data indicating a buyer's acceptance or otherwise of offers of alternative services or goods as compensation.

Seller Data

Seller name/ID and password;
seller contact data, e.g. telephone or pager number;
seller PIN data;
collective sales data preferably comprising:
cumulative total number of sales;
average value of sales;
cumulative measure of services provided, for example, total number of hours of hired facilities;
complaint data (broadly corresponding to that of a buyer);
sales accepted/declined data;
seller-not-contactable event data;
underwritten status data, for example, "underwritten", not underwritten, "do not request before deadline".

Sales data for goods/services offered, preferably comprising:
price data;
availability data, such as delivery data;
contactability data (may be common to a plurality of services/items);
buyer condition data (where only buyers meeting specified criteria are acceptable to the seller);
contract data, for example including text wording for a contract to be displayed to a buyer before purchase.

Transaction data, preferably including historical transaction data comprising:
sale acceptance data comprising details of accepted and declined sales;
buyer data;
sale value data (monetary or other, for example, time).

Contactability data comprising:
instances of a sellers being contactable or not contactable during predetermined windows of contactability; and, preferably,
instances of a seller logging into the system at other times to check for purchase requests.

Seller Underwriting Criteria Data

This preferably comprises data indicating:
minimum number/value of sales or other quantitative sales measure;
minimum average value of sales;
minimum number of different buyers (preferably the minimum number of different buyers buying from greater than a predetermined minimum number of different sellers);
maximum number of complaints;
maximum number of missed contactability events;
maximum number of declined sales;
price mark-up data, such as rules for the system service provider to mark-up seller prices (for example, "add ½% to all prices", or "add 3% to the prices of underwritten sellers").

The exemplary system described above operates to supply temporary secretaries to potential employers. However the system may be used to supply other services or goods in a broadly similar manner.

In a first alternative example of the application of the invention, the transaction management system is used in supplying an office rental service.

When used for this application the sellers are companies hiring out offices, for example offices they are temporarily not using, and the buyers are companies requiring office space. The sellers are preferably graded according to the number of times they have rented out office space, the total number of hours accrued, and the number of different buyers (hirers) to whom they have provided a service. Buyer data recording the number of complaints against each buyer is also stored in the system to allow sellers to restrict offers of their office space to buyers who have, say, 50 complaint-free office hirings behind them.

Initially sellers are registered with the system and offered to buyers without underwriting. As a seller's bookings mount, the seller's performance is monitored against the underwriting criteria and, once these are attained, the system flags the seller as "underwritten" or "guaranteed", providing the seller agrees. The underwriting criteria may comprise one or more of a minimum number of hires, a minimum number of (different) customers, a minimum average value of hires, a maximum number of complaints, a maximum number of missed windows of contactability, and a maximum number of declined sales.

In such a system the system operator, who effectively acts as a market operating intermediary, compensates buyers buying from underwritten sellers by, for example, bearing the costs of rescheduling or replacing an agreed office hire. This compensation may be provided when an underwritten seller finds they cannot complete, say, for unforeseen reasons (assuming the seller informs the intermediary that the agreement cannot be complied with) or when a buyer finds that an underwritten seller cannot comply with his request (assuming the buying informs the system operator that the agreed deal cannot be complied with).

Instances of compensation relating to a seller are recorded in the system database 214 and retention of underwritten status by a seller is preferably conditional upon compliance with compensation related conditions. These conditions may include one or more of a maximum number of sales aborted where the seller finds they cannot complete the agreed transaction, and a (possibly different) maximum number of sales aborted where the buyer finds that the seller cannot complete the transaction as agreed. Where the seller finds they cannot complete a transaction as agreed there may be a time component to the maximum number of aborted sales, based upon a points system. For example, cancelling a hire with two days' notice may accrue one penalty point whilst cancelling with one hours notice may accrue six penalty points, a threshold total of, for example, twelve penalty points resulting in the seller losing their underwritten status.

Where a buyer finds that an underwritten seller cannot comply with an agreed transaction this is preferably first checked by the system service provider to confirm that the seller is guilty of non-compliance.

As described above, the system performs regular sweeps to check for sellers who may be entitled to be promoted to underwritten status and also to check for any sellers who should be demoted from underwritten status. When an underwritten seller is demoted they are preferably e-mailed automatically giving details of the reason.

In one embodiment of this application of the system the seller is offered the opportunity to fund the cost of compensation themselves, either at the time or retrospectively. If the seller chooses, for example, to fund the entire costs of compensation, such as the costs of replacement office hire, the record of the number of sales aborted and requiring compensation is corrected, and hence the seller's underwritten status is not affected.

It is preferable when the system is operated in a market for office rentals and, depending upon the circumstances also in other markets, that a seller is only underwritten for sales up to a certain value, for example a percentage of the average value of the seller's hires. This reduces the risk of a seller accruing a large number of relatively short office hires, such as one day hires, and then qualifying for underwritten status for significantly longer office hires of, for example, one month. Thus in a preferred embodiment, where this is implemented, the transaction management system server 210 determines whether or not a seller qualifies for underwritten status based upon the buyers requirements, i.e. upon the buyer enquiry data or buyer purchase request data. In this way a determination of whether or not a seller qualifies for underwritten status may be made separately for each transaction or group of transactions rather than globally, which reduces the exposure of the intermediary to possible fraud or unduly high levels of compensation.

In a second alternative application of the system the service provider or intermediary operates a market for items of commerce, in the following example, book sales.

In this example the criteria for a seller achieving underwritten status comprise a minimum number of sales, a minimum number of different buyers with an average transaction value not less than a predetermined percentage of the value of the intended purchase, and maximum permitted values for numbers of complaints, missed contactability windows, and declined sales.

The criteria for paying compensation may broadly correspond to those described above, i.e. the intermediary may underwrite the availability of a requested book from a selected seller or broader criteria may be employed including one or more of: the seller actually possessing the goods he or she is purporting to sell, the goods being fairly described by the seller, the seller being contactable by the market-place (intermediary) to be informed of a sale, the seller accepting the sale at the price displayed to the buyer, and the seller dispatching the purchased item at the time promised.

The system operator or intermediary is, in effect, offering peace of mind to the buyer through the underwriting process and can thus increase a seller's prices accordingly. The intermediary is able to underwrite sellers in this way because the system stores transaction history data and thus it is possible to identify sellers who are a good bet for underwriting because they have proved reliable in the past.

Buyers are able to initiate complaints about a seller. A seller's underwritten status may additionally be dependent on a maximum number of such complaints currently unresolved or in which the seller was deemed to be at fault.

Compensatory offers to a buyer may comprise the same item (book) from an alternative seller, or an equivalent or better item, for example a hardback to replace a paperback, or a sum of money, book tokens or the like.

In some applications of the system registered sellers may operate in more than one market sector, for example, supplying both goods and services or supplying two separate types of services. In this case a seller's underwritten status may be transferred from one market sector to another so that, for example, a reputation for reliability in selling books resulting in underwritten status in that market may be employed to confirm underwritten status in another different or related market such as the sale of recorded music or the offer of book repair or binding services. However where underwritten status is transferable between market sectors it is then also preferable that loss of underwritten status in one market sector also results in loss of underwritten status in the other market sectors in which the seller operates.

In the described embodiments and applications of the transaction management system and, more generally, in markets in which buyers and sellers operate, a system and method may be provided for handling and acting upon complaints.

Thus the seller grades described above may include, as a criterion, a condition on the maximum number of upheld complaints or "judgements" allowed against the seller. For example, for the lowest level grade four judgements may be permitted but for higher grades, such as guaranteed or underwritten grades, only two judgements may be allowed. Preferably such "judgements" are traded out or discounted after a predetermined time interval which will generally be grade-dependent. Thus, for example, at a low grade a judgement may be traded-out after 100 hours whereas at a higher grade a judgement may only be traded-out after 300 hours. Judgements may be traded-out based on other measures than elapsed time such as, in the case of temps, number of hours of employment or service provided, or in the case of book sales, a minimum further value of sales.

Similarly buyers may also be allocated grades dependent, in part, upon the number of upheld complaints or "judgements" allowed against a buyer. Thus in the example of employers of temporary secretaries, an entry level "untested" by a grade may be allowed three upheld judgements which are traded-out or discounted after four bookings whereas an upper, "dependable" grade imposed stricter requirements.

The transaction management system preferably monitors the number of complaints against sellers and, optionally, buyers for determining whether a seller is to be assigned guaranteed or underwritten status and, optionally, to allow sellers to imposed conditions on acceptable buyers.

Although raw complaint data is of value it is preferable where this data is being relied upon that some assessment be made on whether or not a complaint is valid or justified. Thus the system preferably incorporates a mechanism for adjudicating on complaints relating to transactions between the buyer and the seller. This mechanism may either be automated and facilitated by the transaction management system, for example by transaction server 210, or it may comprise a conventional mediation or arbitration procedure performed off-line.

In an automated embodiment transaction server 210 operates to input complaint data from a buyer or seller such as a transaction identifier and text data describing the complaint, and to store this complaint data in database 214.

If complaint data is then forwarded to the other party, i.e. the seller or the buyer, and complaint response data such as text data describing a response to the complaint is retrieved from the other party and again stored in transaction database 214. The complaint and response data are then transmitted to an adjudication system or a adjudication terminal for use by an adjudicator, together with further details of the identified transaction retrieved from the transaction database. The adjudication system or adjudicator then takes a decision based upon the complaint and response and the decision is sent to the transaction management system and logged in transaction database 214 together with, preferably, a date and/or time stamp. In embodiments of the system a reply to the complaint response and/or evidence may also be input for presentation to the adjudication system or adjudicator.

In the example of a market for temporary secretaries described above, the following tables show examples of the requirements for buyer (employer) and seller (temp) grades respectively:

| Grade | Trading Activity Required | Upheld Judgements Allowed | Judgements Traded Out After: |
|---|---|---|---|
| Untested | 0-5 bookings | 4 | 4 bookings |
| Basic | 6-19 bookings | 2 | 10 bookings |
| Dependable | >20 bookings | 1 upheld judgement allowed per 30 bookings | |

| grade | auto-promotion requirement | skills certification level | | | | judgements allowed | judgements traded out after | missed log-ins allowed | job turn downs allowed |
|---|---|---|---|---|---|---|---|---|---|
| | | wpm | word | excel | power point | | | | |
| entry | N/A | 0 | 0 | 0 | 0 | 4 | 100 hours | infinite | infinite |
| entry + | 50 hours/ min 1 employer | 15+ | 0 | 0 | 0 | 4 | 100 hours | 5 in 10 | infinite |
| 1 | 100 hours/ min 4 employers | 15+ | 0 | 0 | 0 | 3 | 150 hours | 4 in 10 | 10 in 20 |
| 2 | 250 hours/ min 6 employers | 20+ | 1 | 1 | 1 | 3 | 200 hours | 3 in 10 | 6 in 20 |
| 3 | 500 hours/ min 8 employers | 20+ | 1 | 1 | 1 | 3 | 250 hours | 2 in 10 | 5 in 20 |
| 4 | 750 hours/ min 10 employers | 30+ | 2 | 2 | 2 | 2 | 300 hours | 1 in 10 | 2 in 10 |
| 5 | 1,000 hours/ min 12 employers | 40+ | 3 | 3 | 3 | 2 | 300 hours | 1 in 10 | 2 in 10 |
| 6 | 1,500 hours/ min 20 employers | 40+ | 3 | 3 | 3 | 2 | 300 hours | 1 in 10 | 2 in 10 |

Complaint assessment or judgement mechanisms usable with the system include a professional arbitration service, a professional standards body relating to the goods or services being traded in the relevant market place or supply chain (for example the National Medical Standards Body in a market for temporary nurses) and industry middlemen (for example recruitment agencies in a temporary work market). The decision, judgement, or outcome of the complaint adjudication may simply determine whether or not the party against whom the complaint was made was guilty or not, or the decision may assign guilt to either the seller, the buyer, a third party, or decide that no one was guilty.

Thus according to a further aspect of the invention there is provided a transaction management system for managing the purchase of an item and/or service by a buyer from a seller, the system comprising; a data store for storing seller data comprising, for each of a plurality of sellers, a seller identifier, seller offer data indicating at least one service or item of commerce offered for sale; a program store storing processor implementable instructions; and a processor coupled to the data store and to the program store for implementing the stored instructions; wherein the stored instructions comprise instructions for controlling the processor to: implement a buyer interface to output seller offer data for a plurality of sellers, and to receive a purchase request from the buyer accepting a said offer, the purchase request comprising request data indicating a service or item of commerce requested by the buyer; identify a seller offering the requested service or item; implement a seller interface to output the request data to the identified seller for requesting purchase of the service or item; the instructions further comprising instructions to: input and store complaint data relating to a seller; grade said sellers in at least partial dependence upon said complaint data; and implement said buyer interface to output an indication of a seller grade in association with said seller offer data.

The invention also provides a method for operating a market in which a plurality of sellers offer goods and/or services to buyers, the method comprising: monitoring transactions between the buyers and sellers; receiving a complaint made by a buyer about a seller; adjudicating the complaint to determine whether or not the complaint was justified; determining a measure of justified complaints against a seller; and using the measure of justified complaints for the benefit of the buyers.

The adjudication may be performed by the intermediary, an appointed person, or some other person or system. The measure of complaints may comprise a count of the number of complaints or a measure of the value of the complaints based upon, for example, values of the transactions concerned. The measure may be used simply to inform the buyers of the complaints or it may be used, for example, by an intermediary between the buyers and sellers, to determine whether certain sellers should be guaranteed or underwritten. Preferably, however, the measure of complaints against a seller is not the sole criterion for determining whether or not that seller should be underwritten. In a preferred embodiment the method is implemented by the intermediary. The method may be implemented using a data processing system communicating with the buyers and sellers over a network such as the Internet.

In above described embodiments of the system the Internet, and more specifically web technology, is used for communication between a central computer system and the buyers and sellers. However, it is not necessary to implement the invention using the Internet and the system may, for example, be implemented on local or wide area networks, wireless mobile communications networks, cable tv networks and the like. Similarly, the terminals used by the buyers and sellers for communicating with the central computer system may comprise mobile phone handsets, personal digital assistants, inter-active televisions and the like. Likewise, as it is well known to those skilled in the art, the processing for performing the functions described above may be shared between machines in ways other than that shown in the illustrated embodiments.

No doubt many other effective alternatives will occur to the skilled person and it will be understood that the invention is not limited to the described embodiments and encompasses modifications apparent to those skilled in the art lying within the spirit and scope of the claims appended hereto.

The invention claimed is:

1. A transaction management system for managing the purchase of an item and/or service by a buyer from a seller, the system comprising;
  a data store for storing seller data comprising, for each of a plurality of sellers, a seller identifier, seller offer data indicating at least one service or item of commerce offered for sale, the data store further storing, for each of the sellers, seller defined seller contactability data indicating at least one date and/or time by when the seller should be contactable which date and/or time defines a contactability window;
  a program store storing processor implementable instructions; and
  a processor coupled to the data store and to the program store for implementing the stored instructions; wherein the stored instructions comprise instructions for controlling the processor to:
    implement a buyer interface to output seller offer data for a plurality of sellers, and to receive a purchase request from the buyer accepting a said offer, the purchase request comprising request data indicating a service or item of commerce requested by the buyer and a delivery date and/or time for a requested service or item as well as a purchase request deadline indicating the date and/or time by when a response to the purchase request is required;
    determine a system confirmation deadline using the purchase request deadline;
    identify a seller offering the requested service or item, which seller's contactability window indicates a date and/or time by when the seller should be contactable, which date and/or time is prior to the system confirmation deadline;
    implement a seller interface to output the request data to the identified seller for requesting purchase of the service or item;
    monitor communication of the identified seller with the system during the seller's contactability window to ascertain compliance data for determining whether the identified seller is willing or able to comply with the buyer purchase request;
    determine whether the identified seller has accepted the requested purchase by the system confirmation deadline using said compliance data; and
    output compensation data by selecting one or more sellers of an alternative service or item to replace the service or item requested by the buyer if the identified seller has not accepted the requested purchase by the system confirmation deadline, and the one or more sellers of the alternative service or item being contactable before the delivery date and/or time for the requested service or item thereby to compensate the buyer.

2. A transaction management system as claimed in claim 1, wherein the data store further stores compensation criteria data defining at least one compensation criterion; wherein the seller data includes historical data comprising data relating to past sales and/or contactability of a seller: and wherein the stored instructions further comprise instructions for controlling the processor to: implement the buyer interface to output an indication of which of the sellers and/or services or items offered for sale meet the compensation criterion; determine whether the identified seller and/or requested service or item meets the compensation criterion; and output the compensation data conditionally upon the identified seller meeting the criterion.

3. A transaction management system as claimed in claim 2, wherein the seller contactability data defines a plurality of contactability windows; wherein the historical data comprises historical contactability data; wherein the stored instructions further comprise instructions for controlling the processor to:
  monitor whether a seller is in contact with the system during a said window; and
  update said historical contactability data in response to the result of said monitoring; and
  wherein said at least one compensation criterion includes a historical contactability criterion.

4. A transaction management system as claimed in claim 2, wherein the data store includes value data for a service or item of commerce, and wherein the compensation criteria data defines a compensation criterion dependent upon the value data of the service or item of commerce requested by the buyer.

5. A transaction management system as claimed in claim 2, wherein the historical data includes data relating to occasions when a seller has not accepted a requested purchase by the system confirmation deadline; and wherein the compensation criteria data includes data defining a maximum number or value of declined sales.

6. A transaction management system as claimed in claim 2, wherein the stored instructions further comprise instructions for controlling the processor to:
  input and store in the data store complaint data for a seller; and
  wherein the compensation criteria data includes data defining a maximum number or value of sale complaints.

7. A transaction management system as claimed in claim 2, wherein the seller data includes price data for the services and/or items of commerce for sale; wherein the data store further comprises price adjustment data; and wherein the stored instructions further comprise instructions for controlling the processor to:
  implement the buyer interface to output price information for services and/or items of commerce available from the sellers;
  calculate adjusted price information for sellers meeting the compensation criterion, using the price data and price adjustment data.

8. A transaction management system as claimed in claim 7, wherein the stored instructions further comprise instructions for controlling the processor to:
  determine said price adjustment data using said historical data.

9. A transaction management system as claimed in claim 2, wherein the seller data includes seller grade data; wherein said compensation criteria data includes data defining a threshold seller grade; and wherein the stored instructions further comprise instructions for controlling the processor to:
  determine the seller grade for a seller using the historical data for the seller.

10. A transaction management system as claimed in claim 1, wherein the stored instructions further comprise instructions for controlling the processor to:
  determine a purchase request date and/or time; and
  determine the system confirmation deadline using the difference between the purchase request date and/or time and the purchase request deadline.

11. A transaction management system as claimed in claim 10, wherein the stored instructions further comprise instructions for controlling the processor to:
  determine a revised confirmation deadline using the difference between the purchase request deadline and a date and/or time later than the system confirmation deadline determined using the purchase request deadline; and
  select one or more sellers of an alternative service or item to replace the service or item of commerce requested by the buyer, and contactable before the revised confirmation deadline.

12. A transaction management system as claimed in claim 11, wherein said compensation data comprises purchase data for requesting purchase of an alternative service or item of commerce; and
  wherein the stored instructions further comprise instructions for controlling the processor to:
    implement the seller interface to output said compensation data to a said selected seller of the alternative service or item;
    determine whether the said selected seller has accepted the requested purchase of the alternative service or item; and
    determine a further revised system confirmation deadline and select one or more sellers of a further alternative service or item if the said selected seller has not accepted the requested purchase of the alternative service or item by the revised system confirmation deadline.

13. A transaction management system as claimed in claim 1, wherein said compensation data comprises data indicating a compensating offer of an or the alternative service or item for the buyer, to replace or supplement the requested service or item; and wherein the stored instructions further comprise instructions for controlling the processor to:
  implement the buyer interface to output said compensation data, and to input acceptance data; and
  implement the seller interface to output request data for the alternative service or item to a seller of the alternative service or item if the acceptance data indicates acceptance of the compensating offer.

14. A transaction management system as claimed in claim 1, wherein the compensation data comprises purchase data for requesting purchase of the or an alternative service or item of commerce from an alternative seller to the identified seller; and wherein the stored instructions further comprise instructions for controlling the processor to:
  select one or more said alternative sellers of the or an alternative service or item of commerce; and
  output the compensation data to a said alternative seller.

15. A transaction management system as claimed in claim 14, wherein the stored instructions further comprise instructions for controlling the processor to:
  determine a revised system confirmation deadline;
  determine whether the alternative seller has accepted the requested purchase by the revised system confirmation deadline; and
  output data responsive to the determination of whether the alternative seller accepted before the revised system confirmation deadline.

16. A method for managing the purchase of an item and/or service by a buyer from a seller, the method comprising:
  storing in a data store seller data comprising, for each of a plurality of sellers, a seller identifier, seller offer data indicating at least one service or item of commerce offered for sale, further storing in the data store, for each of the sellers, seller defined seller contactability data indicating at least one date and/or time by when the seller should be contactable, which date and/or time defines a contactability window;
  implementing a buyer interface to output seller offer data for a plurality of sellers, and to receive a purchase request from the buyer accepting a said offer, the purchase request comprising request data indicating a service or item of commerce requested by the buyer and a delivery date and/or time for a requested service or item as well as a purchase request deadline indicating the date and/or time by when a response to the purchase request is required;
  determining a system confirmation deadline using the purchase request deadline;
  identifying a seller offering the requested service or item, which seller's contactability data indicates at least one date and/or time by when the seller should be contactable, which date and/or time is prior to the system confirmation deadline;

implementing a seller interface to output the request data to the identified seller for requesting purchase of the service or item;

monitoring communication of the identified seller with the system during the seller's contactability window to ascertain compliance data for determining whether the identified seller is willing or able to comply with the buyer purchase request;

determining whether the identified seller has accepted the requested purchase by the system confirmation deadline using said compliance data; and outputting compensation data by selecting one or more sellers of an alternative service or item to replace the service or item requested by the buyer if the identified seller has not accepted the requested purchase by the system confirmation deadline, and the one or more sellers of the alternative service or item being contactable before the delivery date and/or time for the requested service or item thereby to compensate the buyer.

17. A method as claimed in claim 16, wherein the seller data includes historical data comprising data relating to past sales and/or contactability of a seller; the method further comprising:

storing in the data store compensation criteria data defining at least one compensation criterion;

implementing the buyer interface to output an indication of which of the sellers and/or services or items offered for sale meet the compensation criterion;

determining whether the identified seller and/or requested service or item meets the compensation criterion; and outputting the compensation data conditionally upon the identified seller meeting the criterion.

18. A method as claimed in claim 17, wherein the seller contactability data defines a plurality of contactability windows; wherein the historical data comprises historical contactability data, the method further comprising:

monitoring whether a seller is in contact with the system during a said window; and updating said historical contactability data in response to the result of said monitoring; and wherein said at least one compensation criterion includes an historical contactability criterion.

19. A method as claimed in claim 17, wherein the data store includes value data for a service or item of commerce, and wherein the compensation criteria data defines a compensation criterion dependent upon the value data of the service or item of commerce requested by the buyer.

20. A method as claimed in claim 17, wherein the historical data includes data relating to occasions when a seller has not accepted a requested purchase by the system, confirmation deadline; and wherein the compensation criteria data includes data defining a maximum number or value of declined sales.

21. A method as claimed in claim 17, the method further comprising:

inputting and store in the data store complaint data for a seller; and wherein the compensation criteria data includes data defining a maximum number or value of sale complaints.

22. A method as claimed in claim 17, wherein the seller data includes price data for the services and/or items of commerce for sale; wherein the data store further comprises price adjustment data, the method further comprising:

implementing the buyer interface to output price information for services and/or items of commerce available from the sellers; and calculating adjusted price information for sellers meeting the compensation criterion, using the price data and price adjustment data.

23. A method as claimed in claim 22, the method further comprising:

determining said price adjustment data using said historical data for services and/or the compensation.

24. A method as claimed in claim 17, wherein the seller data includes seller grade data; wherein said compensation criteria data includes data defining a threshold seller grade the method further comprising:

determining the seller grade for a seller using the historical data for the seller.

25. A method as claimed in claim 16, the method further comprising:

determining a purchase request date and/or time; and determining the system confirmation deadline using the difference between the purchase request date and/or time and the purchase request deadline.

26. A method as claimed in claim 25, the method further comprising:

determining a revised system confirmation deadline using the difference between the purchase request deadline and a date and/or time later than the system confirmation deadline determined using the purchase request deadline; and selecting one or more sellers of an alternative service or item to replace the service or item of commerce requested by the buyer, and contactable before the revised system confirmation deadline.

27. A method as claimed in claim 25, wherein said compensation data comprises purchase data for requesting purchase of an alternative service or item of commerce, the method further comprising:

implementing the seller interface to output said compensation data to a said selected seller of the alternative service or item;

determining whether the said selected seller has accepted the requested purchase of the alternative service or item; and determining a further revised system confirmation deadline and selecting one or more sellers of a further alternative service or item if the said selected seller has not accepted the requested purchase of the alternative service or item by the revised system confirmation deadline.

28. A method as claimed in claim 16, wherein said compensation data comprises data indicating a compensating offer of an or the alterative service or item for the buyer, to replace or supplement the requested service or item, the method further comprising:

implementing the buyer interface to output said compensation data, and to input acceptance data; and implementing the seller interface to output request data for the alternative service or item to a seller of the alternative service or item if the acceptance data indicates acceptance of the compensating offer.

29. A method as claimed in claim 16, wherein the compensation data comprises purchase data for requesting purchase of the or an alternative service or item of commerce from an alternative seller to the identified seller, the method further comprising:

selecting one or more said alternative sellers of the or an alternative service or item of commerce; and outputting the compensation data to a said alternative seller.

30. A method as claimed in claim 29, the method further comprising:
    determining a revised system confirmation deadline;
    determining whether the alternative seller has accepted the requested purchase by the revised system confirmation deadline; and
    outputting data responsive to the determination of whether the alternative seller accepted before the revised system confirmation deadline.

31. A machine-readable medium embodying instructions to manage the purchase of an item and/or service by a buyer from a seller, which, when executed by a machine, cause the machine to:
    store in a data store seller data comprising, for each of a plurality of sellers, a seller identifier, seller offer data indicating at least one service or item of commerce offered for sale, further storing in the data store, for each of the sellers, seller contactability data indicating at least one date and/or time by when the seller should be contactable which date and/or time defines a contactability window;
    implement a buyer interface to output seller offer data for a plurality of sellers, and to receive a purchase request from the buyer accepting a said offer, the purchase request comprising request data indicating a service or item of commerce requested by the buyer and a delivery date and/or time for a requested service or item as well as a purchase request deadline indicating the date and/or time by when a response to the purchase request is required;
    determine a system confirmation deadline using the purchase request deadline;
    identify a seller offering the requested service or item, which seller's contactability data indicates a date and/or time by when the seller should be contactable, which date and/or time is prior to the system confirmation deadline;
    implement a seller interface to output the request data to the identified seller for requesting purchase of the service or item;
    monitor communication of the identified seller with the system during the seller's contactability window to ascertain compliance data to determine whether the identified seller is willing or able to comply with the buyer purchase request;
    determine whether the identified seller has accepted the requested purchase by the system confirmation deadline using said compliance data; and
    output compensation data by selecting one or more sellers of an alternative service or item to replace the service or item requested by the buyer if the identified seller has not accepted the requested purchase by the system confirmation deadline, and the one or more sellers of the alternative service or item being contactable before the delivery date and/or time for the requested service or item thereby to compensate the buyer.

* * * * *